(12) United States Patent
Kaneria et al.

(10) Patent No.: US 11,789,468 B1
(45) Date of Patent: *Oct. 17, 2023

(54) SYSTEM AND METHOD FOR THERMAL CONTROL DURING DELIVERY OF A MEDICATION PACKAGE

(71) Applicant: Express Scripts Strategic Development, Inc., St. Louis, MO (US)

(72) Inventors: Ankur Kaneria, Cedar Park, TX (US); Timothy B. Clise, Howell, MI (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,796

(22) Filed: Nov. 28, 2022

Related U.S. Application Data

(63) Continuation of application No. 16/849,415, filed on Apr. 15, 2020, now Pat. No. 11,513,538.

(51) Int. Cl.
| | |
|---|---|
| *G06Q 10/0832* | (2023.01) |
| *G05D 1/00* | (2006.01) |
| *B64C 39/02* | (2023.01) |
| *B64D 1/00* | (2006.01) |
| *B64U 30/20* | (2023.01) |
| *B64U 20/87* | (2023.01) |
| *B64U 10/00* | (2023.01) |
| *B64U 101/64* | (2023.01) |
| *G05D 1/10* | (2006.01) |

(52) U.S. Cl.
CPC ......... *G05D 1/1062* (2019.05); *B64C 39/024* (2013.01); *B64D 1/00* (2013.01); *B64U 10/00* (2023.01); *B64U 20/87* (2023.01); *B64U 30/20* (2023.01); *G05D 1/0088* (2013.01); *G06Q 10/0832* (2013.01); *B64U 2101/64* (2023.01)

(58) Field of Classification Search
CPC .... G05D 1/1062; G05D 1/0088; B64U 30/20; B64U 20/87; B64U 10/00; B64U 2101/64; B64C 39/024; B64D 1/00; G06Q 10/0832
See application file for complete search history.

(56) References Cited

U.S. PATENT DOCUMENTS

| | | |
|---|---|---|
| 8,600,903 B2 | 12/2013 | Eller |
| 9,244,147 B1 | 1/2016 | Soundararajan |

(Continued)

FOREIGN PATENT DOCUMENTS

WO     2017214669 A1    12/2017

*Primary Examiner* — Anne Marie Antonucci
*Assistant Examiner* — Jared C Bean
(74) *Attorney, Agent, or Firm* — Dickinson Wright PLLC

(57) ABSTRACT

A method for controlling an autonomous unmanned aerial vehicle for delivery of a medication package includes determining a thermal control period for the medication package. The method also includes identifying a delivery location corresponding to the medication package. The method also includes identifying at least one environmental characteristic of an environment that includes a delivery three-dimensional flight path between a starting location and the delivery location, wherein the at least one environmental characteristic indicates an actual weather value at the delivery location. The method also includes determining whether to deliver the medication package based on the thermal control period and the at least one environmental characteristic, using the unmanned aerial vehicle.

20 Claims, 8 Drawing Sheets

(56) References Cited

U.S. PATENT DOCUMENTS

| | | |
|---|---|---|
| 9,384,668 B2 | 7/2016 | Raptopoulos |
| 9,536,216 B1 | 1/2017 | Lisso |
| 9,561,871 B2 | 2/2017 | Sugumaran |
| 9,573,684 B2 | 2/2017 | Kimchi |
| 9,659,502 B1 | 5/2017 | Abebe |
| 9,747,901 B1 | 8/2017 | Gentry |
| 9,777,502 B2 | 10/2017 | Curlander |
| 9,798,325 B2 | 10/2017 | Levien |
| 9,801,517 B2 | 10/2017 | High |
| 9,873,408 B2 | 1/2018 | Capizzo |
| 9,984,347 B2 | 5/2018 | Dreano, Jr. |
| 10,139,817 B2 | 11/2018 | High |
| 10,198,708 B2 | 2/2019 | Mattingly |
| 10,293,938 B2 | 5/2019 | Thompson |
| 10,351,239 B2 | 7/2019 | Di Benedetto |
| 10,402,774 B1* | 9/2019 | Phillips .............. G06N 20/00 |
| 10,403,155 B2 | 9/2019 | Kimchi |
| 10,405,198 B2 | 9/2019 | Carpenter |
| 10,486,883 B2 | 11/2019 | Winkle |
| 10,514,690 B1 | 12/2019 | Siegel |
| 10,515,555 B2 | 12/2019 | High |
| 10,538,327 B2 | 1/2020 | High |
| 10,600,020 B2 | 3/2020 | Stenneth |
| 10,614,503 B2 | 4/2020 | High |
| 10,807,714 B2 | 10/2020 | Atchley |
| 10,874,240 B2 | 12/2020 | Lewis |
| 11,053,021 B2 | 7/2021 | Di Benedetto |
| 11,066,186 B2* | 7/2021 | Walsh .............. G06Q 10/1097 |
| 2004/0135031 A1 | 7/2004 | Stupakis |
| 2010/0004802 A1 | 1/2010 | Bodin |
| 2014/0022051 A1 | 1/2014 | Levien |
| 2014/0025230 A1 | 1/2014 | Levien |
| 2014/0032034 A1 | 1/2014 | Raptopoulos |
| 2015/0120094 A1* | 4/2015 | Kimchi .............. G01C 21/20 701/3 |
| 2016/0033966 A1 | 2/2016 | Farris |
| 2016/0189101 A1 | 6/2016 | Kantor |
| 2016/0307449 A1 | 10/2016 | Gordon |
| 2017/0011333 A1 | 1/2017 | Greiner |
| 2018/0144642 A1 | 5/2018 | High |
| 2018/0155011 A1 | 6/2018 | Greiner |
| 2018/0175349 A1 | 6/2018 | Hummer |
| 2018/0215546 A1 | 8/2018 | High |
| 2018/0364740 A1 | 12/2018 | Collins |
| 2019/0012631 A1 | 1/2019 | Chatani |
| 2019/0079509 A1 | 3/2019 | Bosworth |
| 2019/0112049 A1 | 4/2019 | Phan |
| 2019/0180237 A1* | 6/2019 | Mattingly ............ H04L 9/0825 |
| 2019/0197643 A1 | 6/2019 | Cochran |
| 2019/0197646 A1 | 6/2019 | Prager |
| 2019/0248507 A1 | 8/2019 | Fox |
| 2019/0299802 A1 | 10/2019 | Neubecker |
| 2019/0300202 A1 | 10/2019 | High |
| 2019/0340569 A1* | 11/2019 | Prager ............ G06Q 10/06315 |
| 2020/0017237 A1 | 1/2020 | Walker |
| 2020/0062396 A1 | 2/2020 | Gordon |
| 2020/0175471 A1 | 6/2020 | Tsuruta |
| 2021/0300554 A1* | 9/2021 | Bergkvist ............ G08G 5/0039 |

* cited by examiner

SYSTEM AND METHOD FOR THERMAL CONTROL DURING DELIVERY OF A MEDICATION PACKAGE

CROSS-REFERENCE TO RELATED APPLICATIONS

This application is a continuation of U.S. patent application Ser. No. 16/849,415 filed Apr. 15, 2020 (now U.S. Pat. No. 11,513,538), the entire disclosure of which is incorporated by reference.

TECHNICAL FIELD

This disclosure relates to medication delivery and in particular to systems and methods for thermal control during delivery of a medication package.

BACKGROUND

Medications, such as prescription medications, over-the-counter medications, vitamins, supplements, and the like, are increasingly being delivered by a medication provider to a residence or other location of an individual requiring such medications. Medications may be delivered using a variety of delivery services, such as a postal service, a parcel delivery service, a contractor, or other service under direct control of a corresponding medication provider, and the like.

Some medications, such as insulin, probiotics, certain antibiotics, and the like, may be susceptible to exposure to thermal conditions of a delivery environment without proper care during delivery. For example, insulin may gradually lose efficacy after a period of heat exposure, which may cause the insulin, if used by the individual, to provide unpredictable results, causing undesired and/or dangerous side effects for the individual.

SUMMARY

This disclosure relates generally to medication delivery.

An aspect of the disclosed embodiments includes a method for controlling an unmanned aerial vehicle for delivery of a medication package. The method includes determining a thermal control period for the medication package. The method also includes identifying a delivery location corresponding to the medication package. The method also includes identifying at least one environmental characteristic of an environment that includes a delivery three-dimensional flight path between a starting location and the delivery location, wherein the at least one environmental characteristic indicates an actual weather value at the delivery location. The method also includes determining whether to deliver the medication package based on the thermal control period and the at least one environmental characteristic, using the unmanned aerial vehicle.

Another aspect of the disclosed embodiments includes an apparatus for controlling unmanned flight delivery of a medication package. The apparatus includes a processor and a memory. The memory includes instructions that, when executed by the processor, cause the processor to: determine a thermal control period for the medication package; identify a delivery location corresponding to the medication package; identify at least one environmental characteristic of an environment that includes a delivery three-dimensional flight path between a starting location and the delivery location wherein the at least one environmental characteristic indicates, at least, an actual weather condition at the delivery location; and determine whether to deliver the medication package based on the thermal control period and the at least one environmental characteristic, using an unmanned aerial vehicle.

Another aspect of the disclosed embodiments includes a computing device for controlling delivery of a medication package. The computing device includes at least one processor and at least one memory. The at least one memory includes instructions that, when executed by the at least one processor, cause the at least one processor to: determine a thermal control period for the medication package; determine whether to deliver the medication package based on the thermal control period and at least one environmental characteristic corresponding to a delivery path between a delivery hub and a delivery destination; in response to a determination to deliver the medication package, selectively instruct an unmanned aerial vehicle (UAV) to transport the medication package from the delivery hub to the delivery destination; receive a notification from the unmanned aerial vehicle indicating that the unmanned aerial vehicle deposited the medication package at the delivery destination; determine, in response to receiving the notification, whether a recipient of the medication package has retrieved the medication package; in response to a determination that the recipient of the medication package has not retrieved the medication package, calculate a difference between the thermal control period and a package delivery period, the package delivery period corresponding to a period between the unmanned aerial vehicle leaving the delivery hub with the medication package and a current time; and in response to a determination that the difference between the thermal control period and the package delivery period is less than a threshold, selectively instruct one of the unmanned aerial vehicle or one of a plurality of other unmanned aerial vehicles to retrieve the medication package from the delivery destination.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
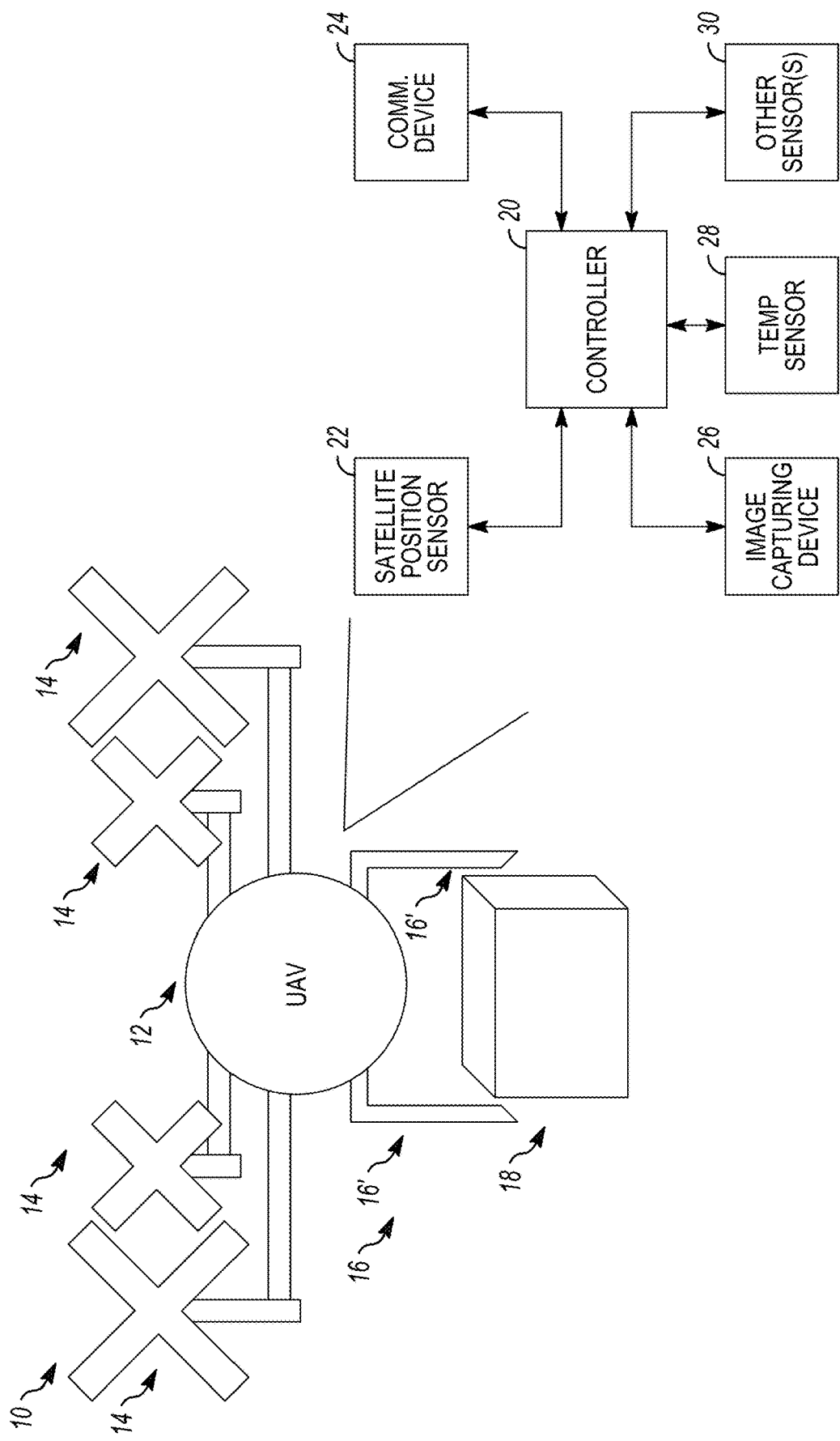
FIG. 1 generally illustrates an unmanned aerial vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, medications, such as prescription medications, over-the-counter medications, vitamins, supplements, and the like, are increasingly being delivered by a medication provider to a residence or other location of an individual requiring such medications. Medications may be delivered using a variety of delivery services, such as a postal service, a parcel delivery service, a contractor, or other service under direct control of a corresponding medication provider, and the like. Such delivery services may be ground-based vehicles or aircraft.

Some medications, such as insulin, probiotics, certain antibiotics, and the like, may be susceptible to exposure to thermal conditions of a delivery environment without proper care during delivery. For example, insulin may gradually lose efficacy after a period of heat exposure, which may cause the insulin, if used by the individual, to provide unpredictable results, causing undesired and/or dangerous side effects for the individual. Typically, medication providers provide a temperature controlled package (e.g., using an insulated container and/or ice, gel packs, dry ice, and the like) for delivery of medications that are susceptible to damage resulting from extended exposure to relatively high temperatures or extended exposure to relatively low temperatures.

Such temperature controlled packages (e.g., including various medications) are typically prepared by the medication provider at a corresponding facility and then transported or handed off to a delivery service, such as those described herein. The delivery service may then transport the temperature-controlled packages through a corresponding delivery network until the temperature-controlled packages reach respective delivery destinations.

Typically, the medication provider determines a proper type and amount of thermal protection for a medication package (e.g., a temperature controlled package), taking into account an amount of time, or package delivery period, that the medication package will be in a corresponding delivery network and/or an estimated amount of time, or an estimated retrieval period, that the medication package may remain at the deliver destination (e.g., after being deposited by the delivery service) before a recipient (e.g., an individual requiring the medications or other occupant of the delivery destination) retrieves the medication package (e.g., and removes the medication from the v package for proper storage and/or use).

However, due to variation in the delivery network, traffic along a delivery route, weather conditions, and the like, delivery of the medication package may be delayed, which may cause the medication in the medication package to be exposed to increased or decreased temperatures, which may adversely affect the efficacy of the medication, as described.

Accordingly, systems and methods, such as those described herein, that are configured to provide improved thermal control of medication packages, may be desirable. The systems and methods described herein may be configured to determine a thermal control period for the medication package. The systems and methods described herein may be configured to identify a delivery location corresponding to the medication package. The systems and methods described herein may be configured to identify at least one environmental characteristic of an environment that includes a delivery route between a starting location and the delivery location. The systems and methods described herein may be configured to determine whether to deliver the medication package based on the thermal control period and the at least one environmental characteristic. The systems and methods described herein may also determine the length of time a mediation package may remain at the delivery location before the thermal budget of the medication inside of the mediation package is exceeded.

In some embodiments, the thermal control period corresponds to a period that a medication of the medication package may safely remain in the medication package. In some embodiments, the at least one environmental characteristic includes a thermal profile of the delivery location. The thermal profile may vary based on environmental conditions at the location of the medication package, which may be measured using the at least one environmental characteristic. In some embodiments, the at least one environmental characteristic includes a maximum predicted wind velocity along the delivery route. In some embodiments, the at least one environmental characteristic includes an average predicted wind velocity along the delivery route. In some embodiments, the at least one environmental characteristic includes an average predicted thermal exposure of the medication package along the delivery route. In some embodiments, the at least one environmental characteristic includes an average predicted thermal exposure of the medication package during a period the medication package is estimated to be at the delivery location.

In some embodiments, the systems and methods described herein may be configured to identify at least one recipient characteristic corresponding to a recipient of the medication package. The systems and methods described herein may be configured to, determine whether to deliver the medication package based on the thermal control period, the at least one environmental characteristic, the at least one recipient characteristic, or a combination thereof. The systems and methods described herein may be configured to, in response to a determination to deliver the medication package, deliver the medication package to the delivery location using an unmanned aerial vehicle.

In some embodiments, the systems and methods described herein may be configured to determine a thermal control period for the medication package. The systems and methods described herein may be configured to determine whether to deliver the medication package based on the thermal control period and at least one environmental characteristic corresponding to a delivery path between a delivery hub and a delivery destination. The systems and methods described herein may be configured to, in response to a determination to deliver the medication package, selectively instruct an unmanned aerial vehicle to transport the medication package from the delivery hub to the delivery destination. The systems and methods described herein may be configured to receive a notification from the unmanned aerial vehicle indicating that the unmanned aerial vehicle deposited the medication package at the delivery destination. The systems and methods described herein may be configured to determine, in response to receiving the notification, whether a recipient of the medication package has retrieved the medication package.

In some embodiments, the systems and methods described herein may be configured to, in response to a determination that the recipient of the medication package has not retrieved the medication package, calculate a difference between the thermal control period and a package delivery period. The package delivery period may correspond to a period between the unmanned aerial vehicle left the delivery hub with the medication package and a current time.

In some embodiments, the systems and methods described herein may be configured to, in response to a determination that the difference between the thermal control period and the package delivery period is less than a threshold, selectively instruct one of the unmanned aerial vehicle or one of a plurality of other unmanned aerial vehicles to retrieve the medication package from the delivery destination. The unmanned aerial vehicle and the plurality of other unmanned aerial vehicles may include autonomous unmanned aerial vehicles.

FIG. 1 generally illustrates an unmanned aerial vehicle (UAV) 10 according to the principles of the present disclosure. The UAV 10 may include an aerial vehicle that is unpiloted or unmanned and may be referred to as a drone. The UAV 10 may include a body 12. The body 12 may include any suitable body and comprise any suitable shape and/or size.

In some embodiments, the UAV 10 may include one or more rotors 14. The rotors 14 may be configured to rotate at a rate that causes the UAV 10 to lift. The rotors 14 may be selectively rotatable along a horizontal axis causing the UAV 10, in response to various rotations of selective ones of the rotors 14 about the horizontal axis, to cause the UAV 10 to travel in a forward direction, travel in a backward direction, travel in one of various sideways directions, or travel in any suitable direction. In some embodiments, the one or more of the rotors 14 may rotate along a vertical axis. It should be understood that, while the UAV 10 is illustrated to include four rotors 14, the UAV 10 may include one rotor 14, two rotors 14, three rotors 14, four rotors 14, or any suitable number of rotors 14, and/or other suitable rotors other than the rotors 14. Additionally, or alternatively, the rotors 14 may include any size or number of rotor blades. The rotors 14 may be designed to provide lift for the UAV 10 and/or any package that the UAV 10 may carry to a destination location. In some embodiments, the UAV 10 may include one or more wings to provide lift and/or assist the rotors 14 to lift the UAV 10.

In some embodiments, the UAV 10 may include a carrier 16 disposed on the body 12. The carrier 16 may be configured to carrier or hold a package, such as a medication package 18. The carrier 16 may include one or more carrier arms 16'. The carrier arms 16' may include actuatable or articulate arms in communication with one or more actuating components that cause the carrier arms 16' to extend in any suitable direction and to retract toward the medication package 18, such that the carrier arms 16' securely grip and/or hold the medication package 18. The articulating components may include a stepper motor and a linkage (e.g. or other suitable components) configured to cause the carrier arms 16' to move from an open position to a closed position, to release a package or grip a package respectively.

It should be understood that the carrier 16 and/or carrier arms 16' may include any suitable carrier and/or carrier arms and may be configured to securely grip or hold the medication package 18 in any suitable manner other than those described herein. Additionally, or alternatively, the UAV 10 may include the carrier 16 and/or a basket, a net, a closable compartment (e.g., including a lockable compartment), or any suitable mechanism for securely gripping, holding, and/or carrying the medication package 18.

In some embodiments, the body 12 may be configured to house or enclose a controller 20 configured to control operations of the UAV 10. The controller 20 may include a processor and a memory. The processor may include any suitable processor, such as those described herein. The memory may include Random Access Memory (RAM), a Read-Only Memory (ROM), or a combination thereof. The memory may store programs, utilities, or processes to be executed in by the processor. The memory may provide volatile data storage, and stores instructions related to the operation of the UAV 10. For example, the memory may store UAV specific instructions for execution by the processor and data related to the medication package 18, the other UAVs 10', the environmental characteristics (e.g., or the route, the destination location, and/or other environmental characteristics), other suitable data, or a combination thereof.

Figure 3A:
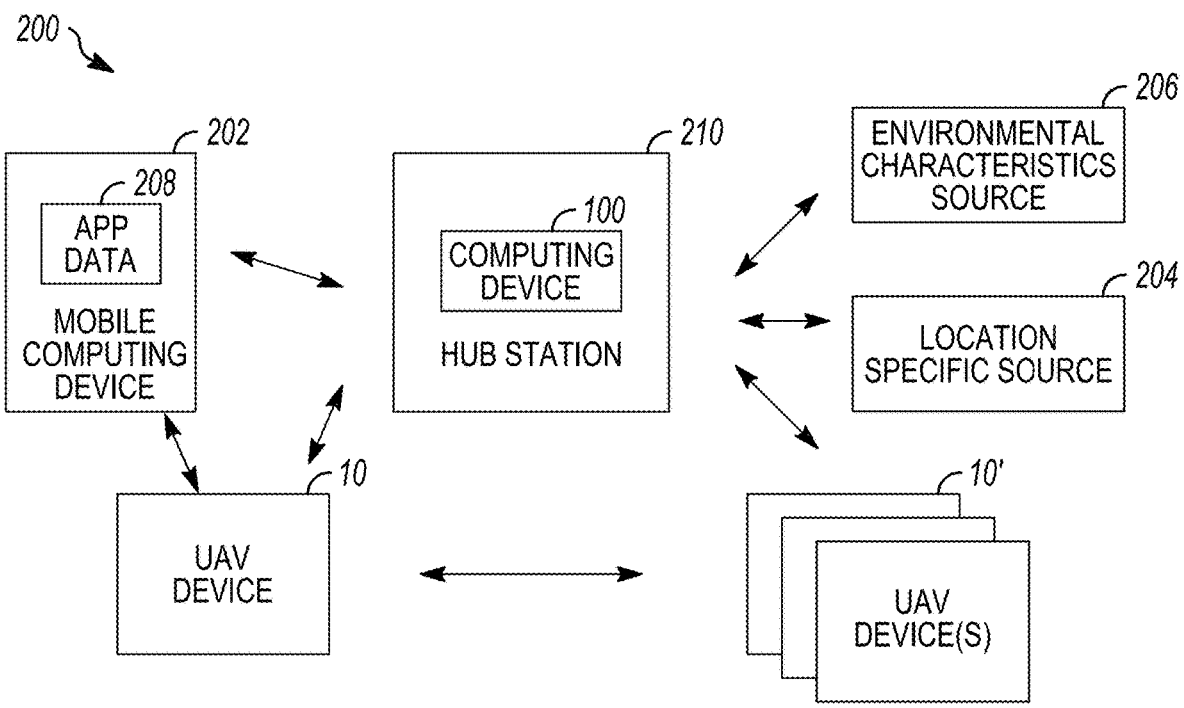
FIG. 3A generally illustrates a block diagram of a medication package delivery system according to the principles of the present disclosure.
Figure 3B:
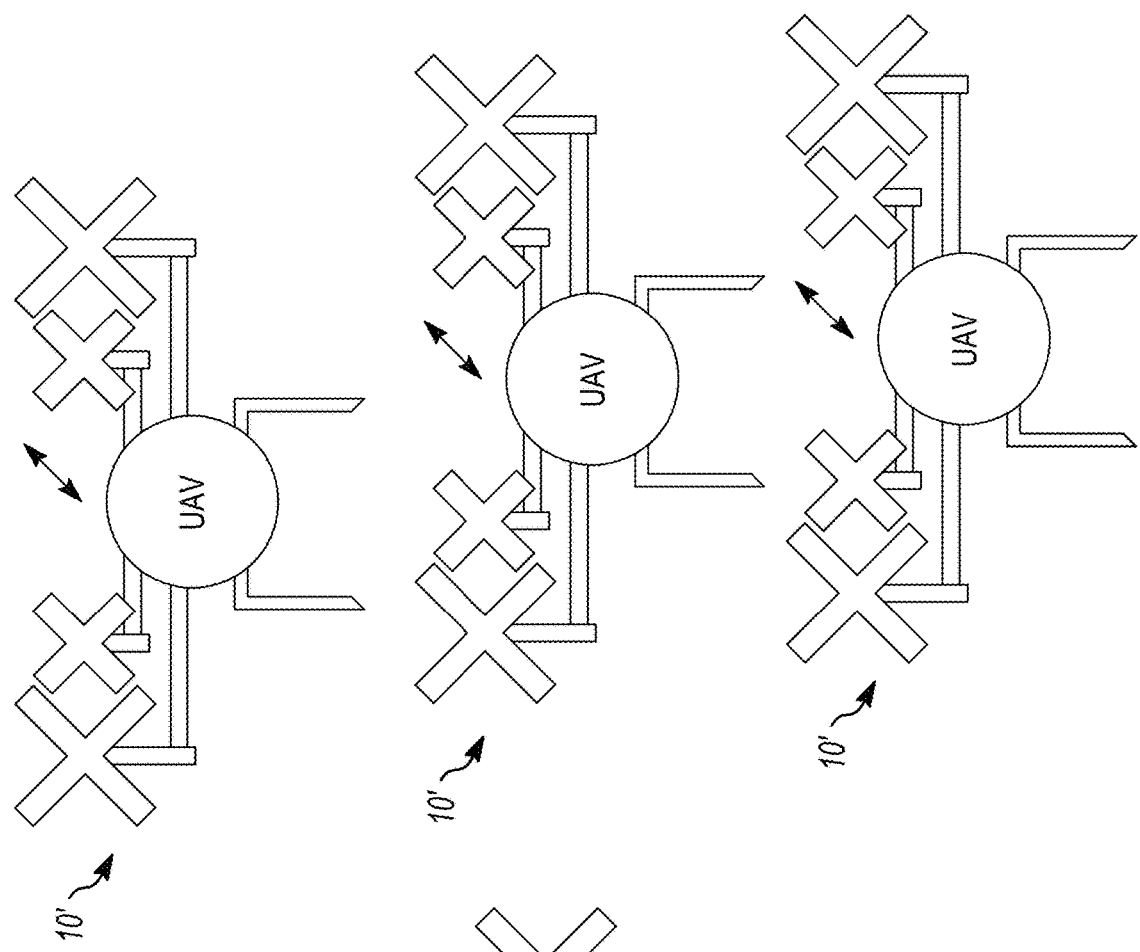
FIG. 3B generally illustrates an unmanned aerial vehicle communications network according to the principles of the present disclosure.
Figure 3B:
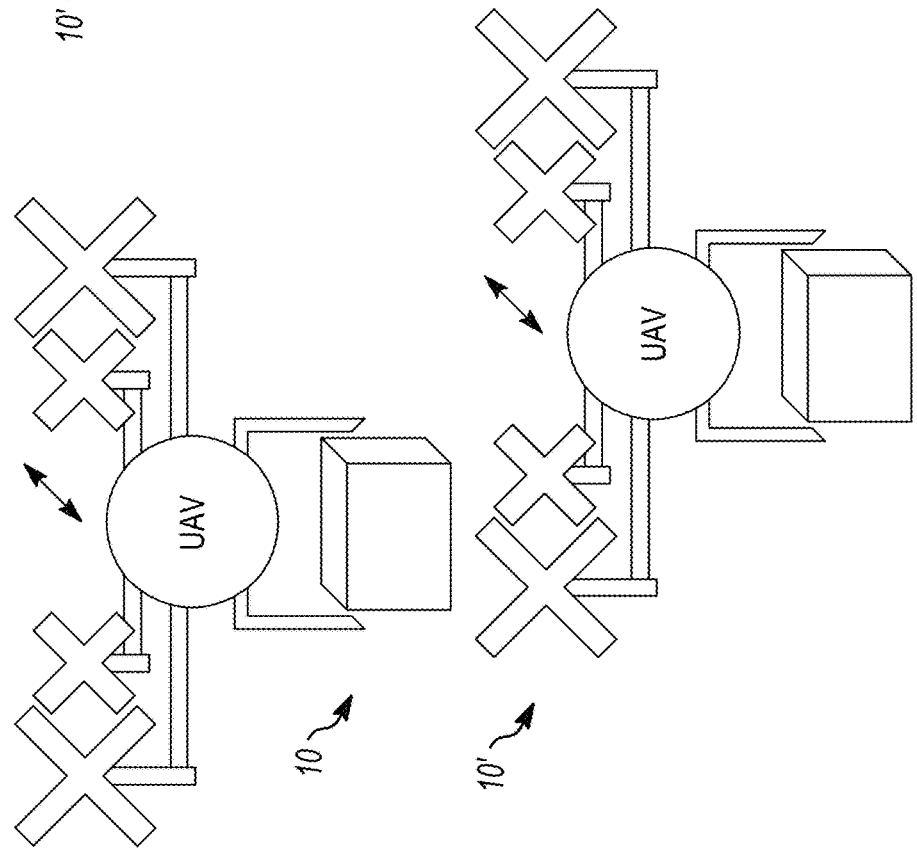

The UAV 10 may include various sensors or data capturing devices. For example, the UAV 10 may include a satellite positioning (e.g., a global positioning system (GPS) sensor) 22 configured to provide global positioning data. The satellite navigation receive may also operate to determine a UAV location using a global navigation satellite system (GLONASS), BeiDue navigation system, Galileo navigation system, and the like. The controller 20 may use the global position data received from the satellite positioning sensor 22 to operate the UAV 10 along a delivery path for the medication package, or any suitable path. The path may be calculated based on information indicating characteristics of the physical terrain and various manmade structures. The UAV 10 may include a communication device 24 configured to communicate with, as is generally illustrated in FIGS. 3A and 3B, other UAVs, such as the other UAVs 10', one or more mobile computing devices, such as the mobile computing device 202, data sources, such as a location specific data source 204 and an environmental characteristics data source 206, a hub station, such as the hub station 210, other suitable devices or mechanism, or a combination thereof.

The communication device 24 may include any suitable communication device, such as a WiFi transmitter and/or receiver, a Bluetooth device, a long-range communication device, a short-range communication device, a radio device, a 4G device, a 5G device, any other suitable communication device, or a combination thereof. The communication device 24 may provide communication device 24 provides communication between the UAV 10 and a hub, a base station, or other UAVs.

The UAV 10 may include an image-capturing device 26 and/or other suitable data capturing devices. The image-capturing device 26 may include a solid-state image device (e.g. a charge-coupled device (CCD), or other suitable solid-state image capturing device), or other suitable image-capturing device. The image-capturing device 26 may include or be one of a plurality of image-capturing devices. The image-capturing device 26 may be configured to capture image data corresponding to an environment external to the UAV 10 (e.g., within a visible range of the image-capturing device 26). The controller 20 may be configured to analyze the image data and selectively control the UAV 10 based on the image data. In some embodiments, the controller 20 may communicate the image data to the hub station 210. The hub station 210 may analyze the image data and communicate instructions for controlling the UAV 10 to the controller 20. The controller 20 may control the UAV 10 based on the instructions.

The UAV 10 may include a temperature sensor 28. The temperature sensor 28 may be configured to sense or measure one or more temperature measurements of the environment external to the UAV 10. The controller 20 may selectively control operations of the UAV 10 based on the one temperature measurements. In some embodiments, the controller 20 may communicate the one or more temperature measurements to the hub station 210. The hub station 210 may analyze the one or more temperature measurements and may provide instructions to the controller 20 for controlling the UAV 10 based on the one or more temperature measurements. The controller 20 may selectively control operations of the UAV 10 and/or other UAVs 10' based on the instructions. The UAV 10 may include other sensors 30. The other sensors 30 may include any suitable sensors include gyroscope sensors, vibration sensors, motion sensors, moisture sensors, light sensors, infrared sensors, radar sensors, LIDAR sensors, sonar sensors, any other suitable sensors, or a combination thereof.

Figure 2:
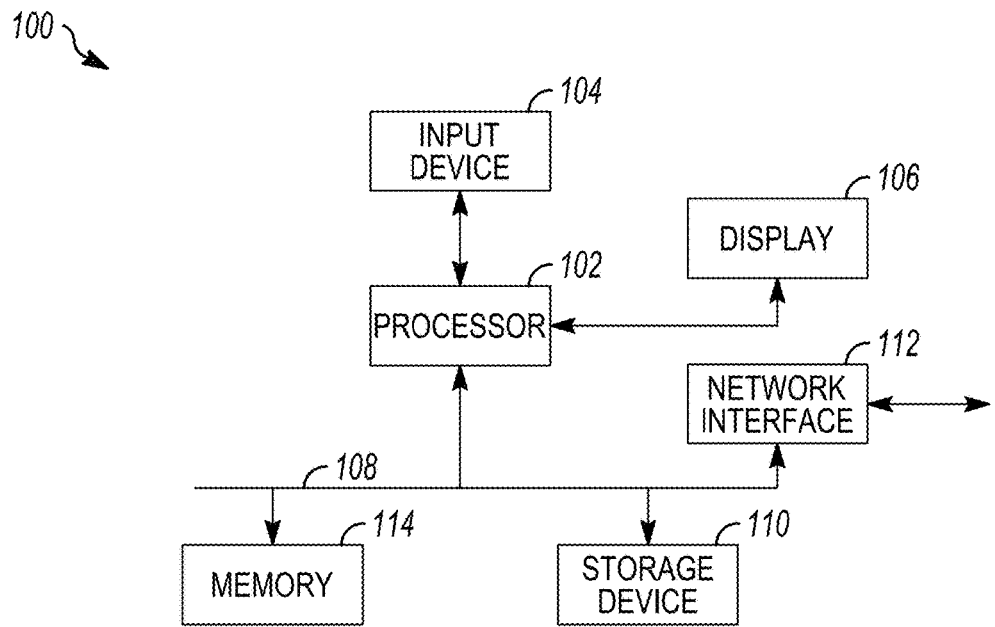
FIG. 2 generally illustrates a computing device according to the principles of the present disclosure.

FIG. 2 generally illustrates a computing device 100 according to the principle of the present disclosure. The computing device 100 may be configured to control operation of the UAV 10 and/or other UAVs 10'. As is generally illustrated, the hub station 210 may include the computing device 100 or any other suitable computing device. The computing device 100 may be any suitable computing device.

The computing device 100 may include a processor 102 configured to control the overall operation of computing device 100. The processor 102 may include any suitable processor, such as those described herein. The computing device 100 may also include a user input device 104 that is configured to receive input from a user of the computing device 100 and to communicate signals representing the input received from the user to the processor 102. For example, the user input device 104 may include a button, keypad, dial, touch screen, audio input interface, visual/image capture input interface, input in the form of sensor data, etc.

The computing device 100 may include a display 106 that may be controlled by the processor 102 to display information to the user. A data bus 108 may be configured to facilitate data transfer between, at least, a storage device 110 and the processor 102. The computing device 100 may also include a network interface 112 configured to couple or connect the computing device 100 to various other computing devices or network devices via a network connection, such as a wired or wireless connection. In some embodiments, the network interface 112 includes a wireless transceiver.

The storage device 110 may comprise a single disk or a plurality of disks (e.g., hard drives), one or more solid-state drives, one or more hybrid hard drives, and the like. The storage device 110 may include a storage management module that manages one or more partitions within the storage device 110. In some embodiments, storage device 110 may include flash memory, semiconductor (solid state) memory or the like. The computing device 100 may also include a memory 114. The memory 114 may include Random Access Memory (RAM), a Read-Only Memory (ROM), or a combination thereof. The memory 114 may store programs, utilities, or processes to be executed in by the processor 102. The memory 114 may provide volatile data storage, and stores instructions related to the operation of the computing device 100.

In some embodiments, the processor 102 may be configured to execute instructions stored on the memory 114 to, at least, control operations of the UAV 10, the other UAVs 10', delivery of the medication package 18, any other suitable operations, or a combination thereof. The processor 102 may be configured to display, on the display 106, various UAV control information, various data corresponding to the medication package 18, other suitable information, or a combination thereof. In some embodiments, the computing device 100 may omit the display 106.

FIG. 3A generally illustrates a block diagram of a medication package delivery system 200, including the UAV 10, the other UAVs 10', and the hub station 210. The UAV 10 may be controlled by a human or robotic pilot via a ground controller and may be referred to as a drone when being controlled by a pilot via a ground controller. In some embodiments, the UAV 10 may be semi-autonomous or fully autonomous. In some embodiments, the computing device 100 of the hub station 210 may provide instructions to the UAV 10 to deliver the medication package 18, retrieve the medication package 18, other suitable instructions, or a combination thereof. The UAV 10 may autonomously carry out the instructions. For example, the computing device 100 may instruct the UAV 10 to transport the medication package 18 to a delivery destination and the UAV 10 may autonomously determine a flight path to the delivery destination and/or autonomously determine or execute various other operations. In some embodiments, the hub station 210 may be housed or located at a pharmacy, at a distribution center, at a delivery center, on a vehicle (e.g., a mobile distribution center), and the like.

In some embodiments, the hub station 210 may identify the UAV 10 and/or one of the other UAVs 10' for delivery of the medication package 18 based on one or more characteristics of the UAV 10 and/or the UAVs 10'. The one or more characteristics may include a flight distance capability (e.g., based on battery charge or other suitable flight distance capabilities), a carrying capacity, a current location of the UAV 10 and/or the UAV 10's to the location of the medication package 18, other suitable characteristics, or a combination thereof. For example, the hub station 210 may determine a total travel distance for the UAV 10 to retrieve the medication package 18 starting from a current location of the UAV 10 and to deposit the mediation package 18 are the destination location. The hub station 210 may determine whether the battery of the UAV 10 includes enough charge to traverse the total travel distance while carrying the medication package 18 (e.g., taking into account the UAV 10 carrying the medication package 18 and any potential drain on the battery do to the weight, size, shape, and/or other characteristics of the medication package 18).

In some embodiments, the medication package 18 may be packed at a pharmacy, distribution center, or other suitable location. As described, the medication package 18 may include a temperature-controlled package including insulation, ice, gel packs, dry ice, any other suitable thermal control mechanism, or a combination thereof. For example, a technician packing medication (e.g., which may include one or more related or unrelated medications) in the medication package 18 may utilize a thermal packaging determination system configured to determine thermal control requirements of the medication in the medication package 18. The thermal packaging determination system may indicate to the technician suitable amounts of thermal packaging for the medication package 18. The technician may selectively include insulation, ice, gel packs, dry ice, other suitable thermal control mechanisms, or a combination thereof based on the indication from the thermal packaging determination system to control temperature of the medication in the medication package 18 for a period. In some embodiments, an automated system may be configured to autonomously include insulation, ice, gel packs, dry ice, other suitable thermal control mechanisms, or a combination thereof based on the indication from the thermal packaging determination system.

The period, which may be referred to as a thermal control period or a thermal budget, may correspond to a period that the temperature of the medication in the medication package 18 is controlled according to the thermal control requirements given various environmental characteristics associated with the transportation and delivery of the medication package 18. For example, the thermal packaging determination system may increase or decrease various amounts of required insulation, ice, gel packs, dry ice, and/or other thermal control mechanisms in response to an average climate (e.g., controlled climate, such as on a delivery vehicle, and/or natural climate) acting on the medication package 18 during transportation and/or delivery of the medication package 18.

In some embodiments, the hub station 210 (e.g., via the computing device 100) may selectively control delivery of the medication package 18 (e.g., and other suitable packages) using the UAV 10 and/or the other UAVs 10'. The UAV 10 and the other UAVs 10' may communicate directly with the computing device 100. Additionally, or alternatively, the UAV 10 and the UAVs 10' may communicate directly with one another using a communications network, such as a mesh network or other suitable network, as is generally illustrated in FIG. 3B.

The computing device 100 may receive instructions indicating that the medication package 18 is ready for delivery. The computing device 100 may receive the instructions from a corresponding pharmacy or any suitable source.

The instructions may indicate a delivery destination or location for the medication package 18. The medication package 18 may be transported to the hub station 210 or the hub station 210 may be located at the pharmacy or other suitable location where the medication package 18 is packed. The computing device 100 may determine, as will be described, whether to deliver the medication package 18 to the delivery destination based on various environmental and other information.

In some embodiments, the computing device 100 may determine a thermal control period for the medication package 18. For example, the computing device 100 may include instructions indicating the delivery destination of the medication package 18. Additionally, or alternatively, the instructions may include an initial thermal control period. The computing device 100 may determine a current time and selectively adjust the initial thermal control period based on the current time (e.g., the computing device 100 may reduce the initial thermal control period by an amount of time that has passed since the medication package 18 was packed). Additionally, or alternatively, the computing device 100 may selectively adjust the initial thermal control period based on any suitable information.

In some embodiments, the computing device 100 may identify one or more environmental characteristics of an environment that includes a delivery route between the hub station 210 (e.g., a starting location) and the delivery destination. For example, the hub station 210 may receive, from one or more environmental characteristic data sources 206, environmental information for the delivery route. The environmental characteristic data sources 206 may include weather measurement devices, e.g., a weather station, a remotely located computing device (e.g., such as a cloud computing server or other suitable remotely located computing device), or the like or a combination thereof. In an example embodiment, the environmental characteristic data source 206 may include a weather database that includes historical environmental information, a database that includes estimated or predicted environmental information, downloads from governmental weather measurement sources that provide a localized weather reading (e.g., within a select distance from the delivery location, such as 0.5 mile, 1.0 mile, less than 2.0 miles, less than 5.0 miles), any other suitable source, or a combination thereof. In an example embodiment, the sources provide actual environmental values at a delivery location, through measurement or by calculation from weather databases, or combinations thereof.

In some embodiments, the environmental information may include an estimated temperature or temperatures for the delivery route during an estimated delivery period, an estimated average temperature for the delivery route during the estimated delivery period, an estimated amount of sun exposure for the delivery route during the estimated delivery period, any other suitable information, or a combination thereof. The temperature and sun exposure can be actual temperature and sunlight values measured by other UAVs at the delivery location or other adjacent delivery locations in combinations with calculated or predicted temperature and sunlight values from weather prediction databases and historical weather databases.

In some embodiments, the environmental information may include an estimated wind velocity or wind velocities for the delivery route during the estimated delivery period, a maximum wind velocity for the delivery route during the estimated delivery period, an average wind velocity for the delivery route during the estimated delivery period, other suitable environmental information, or a combination thereof. The wind velocity can be actual wind values from Doppler radar sources, measurements from UAVs, or combinations thereof.

In some embodiments, the environmental information may include an amount of precipitation currently measured, sensed, or determined along the flight path and/or at the delivery location, an estimated amount of precipitator expected to be experienced by the UAV 10 along the flight path and/or at the delivery location, other suitable environmental information, or a combination thereof.

In some embodiments, the computing device 100 may receive various environmental measurements from the UAV 10 and/or the UAVs 10' while the UAV 10 and/or the UAVs 10' transport other medication packages along various delivery routes that are proximately located to or include at least part of the delivery route of the medication package 18. For example, a first UAV 10' may measure a current temperature and a current wind velocity of a delivery route being traversed by the first UAV 10' and communicate the current temperature and current wind velocity to the computing device 100. Additionally, or alternatively, a second UAV 10' may measure an amount of sun exposure experienced by the second UAV 10' while the traverses another delivery route being traversed by the second UAV 10' and may communicate the amount of sun exposure to the computing device 100.

The second UAV 10' may measure the amount of shade along the delivery route or one or more portions of the delivery route. Additionally, or alternatively, some UAVs 10' and/or the UAV 10 may travel along a portion of a route (e.g., such as a portion of the delivery route) that may be traversed by a subsequent UAV 10' and/or the UAV 10. The measured sun exposure data, the measured shade data, and/or other measured environmental data from the UAVs 10' and/or the UAV 10 may be used to determine the thermal impact on a medication package being carried by the UAV 10 and/or other UAVs 10'. The computing device 100 may use the received measurements to estimate the environmental characteristics of the delivery route for the medication package 18.

It should be understood that the computing device 100 may receive a plurality of measurements from a plurality of UAVs over various periods for various delivery routes. The computing device 100 may analyze the plurality of measurements and may estimate various environmental characteristics of the delivery route for the medication package 18. Additionally, or alternatively, the computing device 100 may estimate the environmental characteristics of the delivery route for the medication package 18 using the received measurements, the received environmental information, any other suitable information, or a combination thereof.

In some embodiments, the computing device 100 may identify one or more location specific characteristics corresponding to the delivery destination. For example, the hub station 210 may receive, from one or more location specific data sources 204, location specific characteristics of the delivery destination. The location specific data sources 204 may include a one or more sensors disposed at the delivery destination, other suitable sources, or a combination thereof. For example, the computing device 100 may in communication with one or more mobile computing devices at or near the delivery destination. The location specific characteristics may include various environmental characteristics of the delivery destination.

The one or more mobile computing devices may include an application that access one or more sensors associated with respective mobile computing devices. The application may receive temperature measurements, wind velocity measurements, other suitable measurements, or a combination thereof from the one or more sensors. The application, for each respective mobile computing device, may communicate the measurements to the computing device 100 or to a central repository that the computing device 100 accesses to retrieve the measurements. The computing device 100 may estimate environmental characteristics of the delivery destination of the medication package 18 using the measurements.

In some embodiments, the computing device 100 may receive various location specific information from the UAV 10 and/or the UAVs 10' while the UAV 10 and/or the UAVs 10' deposit other medication packages to the delivery destination (e.g., during previous delivery of other medication packages). For example, the first UAV 10' may capture one or more images of the delivery destination. The one or more images may include images of a deposit location of another medication package, such as a porch, or other suitable deposit location.

The computing device 100 may receive the one or more images and generate a thermal exposure profile for the deposit location. For example, the computing device 100 may extrapolate or estimate, based on sun light exposure to the deposit location, in the one or more images, an amount of sun light exposure at the deposit location for various times of day during various days of the year. The images may be from UAVs that previously delivered to the delivery location. The use of UAVs to delivery medications is useful as many patients receive subsequent medication, e.g., prescriptions for maintenance medications that may be delivered monthly or every three months. The data surrounding the delivery location can be measured and images taken by the UAV at each delivery. The computing device 100 may output a sunlight exposure value. The computing device 100 may use the sun light exposure value corresponding to the deposit location to estimate an amount of increased (e.g., due to sun exposure) or decreased (e.g., due to an amount of shade at the deposit location) thermal exposure experienced by the medication package 18 during an estimated deposit period. The deposit period may correspond to a period between a time the medication package 18 is estimated to be deposited at the deposit location and a time that a recipient of the medication package 18 retrieves the medication package 18 from the deposit location.

It should be understood that the one or more images may include any suitable information and the computing device 100 may generate any suitable thermal profile for any suitable location at the delivery destination. Additionally, or alternatively, the one or more images may include images of other various delivery destinations or other suitable locations proximately located to the delivery destination. The computing device 100 may generate the thermal profiles for the delivery destination using the images of the other various delivery destinations or other suitable locations. Additionally, or alternatively, the computing device may receive one or more images from the UAV 10 and/or a plurality of the UAVs 10' that include images of any suitable delivery destination, including the delivery destination of the medication package 18, or any other suitable location.

In some embodiments, the one or more images may include or indicate data corresponding to the day of the year and/or the time of day. The computing device 100 may use the data to generate an accurate module at a location along various flight paths to be used by the UAV 10 and/or other UAVs 10'. Additionally, or alternatively, the computing device 100 may use data corresponding to the one or more images to predict sunlight, shade, and/or other visible environmental characteristics for a specific location (e.g., identified using satellite navigation coordinates or other suitable information). The computing device 100 may use the data corresponding to the one or more images to determine a delivery time for the medication package 18 (e.g., or other suitable medication package) and/or a flight path for the UAV 10 and/or other UAVs 10'.

In some embodiments, the computing device 100 may identify one or more recipient characteristics corresponding to a recipient of the medication package 18. For example, the computing device 100 may communicate with a mobile computing device 202. The mobile computing device 202 may correspond to or be associated with the recipient. The mobile computing device 202 may include any suitable mobile computing device, such as a smart phone, a tablet-computing device, and the like. The mobile computing device 202 may include various application data 208. The application data 208 include data from various applications on the mobile computing device 202. For example, the application data 208 may include calendar data, global position (e.g., satellite position data) data or other location data, other suitable data, or a combination thereof.

The computing device 100 may receive the application data 208 from the mobile computing device 202. The computing device 100 may determine or estimate a probability that the recipient will retrieve the medication package 18 during a period based on the application data 208. For example, the computing device 100 may analyze various calendar data and determine a probability, based on various events, calendar appointments tasks, and the like, that the recipient will be at or near the delivery destination within the period. Additionally, or alternatively, the computing device 100 may determine a current location of the mobile computing device 202 based on the satellite positioning data or other location data, and may determine a probability that the recipient will be at or near the delivery destination during the period.

It should be understood that the computing device 100 may use any suitable data, including or in addition to, the application data 208 to estimate or determine the period and/or the probability that the recipient will retrieve the medication package 18 from the deposit location during the period.

In some embodiments, the computing device 100 determines whether to instruct the UAV 10 to deliver the medication package 18 to the delivery destination based on the thermal control period, one or more environmental characteristics, one or more location specific characteristics, one or more recipient characteristics, or a combination thereof. For example, the computing device 100 may estimate the average temperature that the medication package 18 will experience while the UAV 10 transports the medication package 18 to the delivery destination during the estimated delivery period. The average temperature may increase or decrease the thermal control period of the medication package 18. For example, if the computing device 100 determines that the average temperature of the delivery route during the estimated deliver time is above a threshold, the computing device 100 may determine that the thermal control period of the medication package 18 may decrease. The computing device 100 may selectively adjust the thermal control period based on the average temperature.

The computing device 100 may estimate an average temperature and/or an average sun light exposure experienced by the medication package 18 after the UAV 10 deposits the medication package 18 at the deposit location. The computing device 100 may selectively adjust the thermal control period based on the average temperature and/or the average sun light exposure experienced by the medication package 18 at the deposit location.

The computing device 100 may estimate a maximum wind velocity and/or an average wind velocity experienced by the UAV 10 while the UAV 10 traverses the delivery route during the estimated delivery period. As wind velocity increases, the UAV 10 may experience flight resistance, which may cause a power source, such as a battery, of the UAV 10 to decrease in charge. The decrease in charge may cause the UAV 10 to reduce flight speed in order to conserve charge. Additionally, or alternatively, the flight resistance may reduce the flight speed of the UAV 10. A reduction in flight speed may increase the delivery period. If the computing device 100 may selectively adjust the thermal control period based on the estimated maximum wind velocity and/or the average wind velocity. In some embodiments, the UAV 10 and/or other UAVs 10' may include one or more solar panels and/or one or more corresponding solar energy conversion mechanisms. The one or more solar panels may be configured to receive solar energy while the UAV 10 and/or other UAVs 10' traverse a given flight path. The one or more solar energy conversion mechanisms may be configured to convert solar energy received by one or more solar panels into power used to charge the battery or other power source of the UAV 10 and/or other UAVs 10'.

In some embodiments, the computing device 100 may determine, as described, the probability that the recipient will retrieve the medication package 18 from the deposit location during a period. The period may correspond to a period between a time the UAV 10 deposits the medication package 18 in the deposit location and a threshold amount of time before the thermal control period expires. If the computing device 100 determines that the probability that the recipient will retrieve the medication package 18 from the deposit location during the period is less than a threshold, the computing device 100 determines not to instruct the UAV 10 to deliver the medication package 18 during the delivery period. The computing device 100 may then determine another suitable delivery period for the UAV 10 to deliver the medication package 18.

Conversely, if the computing device 100 determines that the probability that the recipient will retrieve the medication package 18 from the deposit location during the period is greater than the threshold, the computing device 100 determines to instruct the UAV 10 to deliver the medication package 18 during the delivery period. The UAV 10 may transport the medication package 18 to the delivery location and may deposit the medication package 18 in the deposit location.

During transportation of the medication package 18, the UAV 10 may measure actual temperatures, wind velocities, sun light exposure, flight speeds, other suitable measurements, or a combination thereof. The UAV 10 may communicate the measurements to proximately located UAVs 10', which may then communicate the measurements to the computing device 100. For example, the UAV 10 and/or other UAVs 10' may communicate via a wireless mesh network. Each of the UAV 10 and the other UAVs 10' may act as a node on the wireless mesh network. For example, each of the UAV 10 and the other UAVs 10' may include a radio transceiver configured to communicate with others of the UAV 10 and the UAVs 10'. The UAV 10 may identify one or more UAVs 10' within a range of the UAV 10. The UAV 10 may communicate, using the radio transceiver, the measurements and/or other information or data to the identified UAVs 10'. The identified UAVs 10' may communicate the measurements and/or other information or data to others of the UAVs 10' or directly to the computing device 100.

Additionally, or alternatively, the UAV 10 may communicate the measurements directly to the computing device 100. The computing device 100 may selectively adjust the thermal control period based on the measurements. The computing device 100 may then determine the probability that the recipient will retrieve the medication package 18 from the deposit location during an adjusted period. The adjusted period may correspond to a period between the time the UAV 10 deposits the medication package 18 and a threshold amount of time until the adjusted thermal control period expires.

If the computing device 100 determines that the probability that the recipient will retrieve the medication package 18 from the deposit location during the adjusted period is less than a threshold, the computing device 100 may instruct the UAV 10 to return the medication package 18 to the hub station 210 for later delivery. Conversely, if the computing device 100 determines that the probability that the recipient will retrieve the medication package 18 from the deposit location during the adjusted period is greater than the threshold, the computing device 100 may instruct the UAV 10 to continue delivery. The computing device 100 may communicate with the UAV 10 directly or using one or more of the other UAVs 10'.

In some embodiments, the medication package 18 may include one or more sensors. The one or more sensors may be configured to measure an actual temperature within the medication package 18, an actual temperature at the deposit location, any other suitable information, or a combination thereof. The computing device 100 may receive measurements from the one or more sensors. For example, the one or more sensors may communicate directly with the computing device 100 and/or indirectly with the computing device 100 using the UAV 10, other UAVs 10', using local wireless networks, other suitable communication techniques or mechanisms, or a combination thereof.

The computing device 100 may selectively adjust the thermal control period of the medication package 18 based on the measurements from the one or more sensors of the medication package 18. The computing device 100 may then determine the probability that the recipient will retrieve the medication package 18 from the deposit location during an adjusted period. The adjusted period may correspond to a period between a current time and a threshold amount of time until the adjusted thermal control period expires.

If the computing device 100 determines that the probability that the recipient will retrieve the medication package 18 from the deposit location during the adjusted period is less than a threshold, the computing device 100 may instruct the UAV 10 or one of the other UAVs 10' to retrieve the medication package 18 from the destination location and return the medication package 18 to the hub station 210 for later delivery.

Conversely, if the computing device 100 determines that the probability that the recipient will retrieve the medication package 18 from the deposit location during the adjusted period is greater than the threshold, the computing device 100 may monitor the medication package 18 to determine whether the recipient has retrieved the medication package 18. For example, the one or more sensors of the medication package 18 may include satellite positioning sensors, gyroscope sensors, motion sensors, other suitable sensors, or a combination thereof. The computing device 100 may receive measurements from the one or more sensors indicating movement of the medication package 18. The movement may indicate that the medication package 18 has been retrieved by the recipient.

Additionally, or alternatively, the computing device 100 may receive, from the mobile computing device 202, an indication that the medication package 18 has been retrieved. For example, the recipient may interact with an application on the mobile computing device 202 to indicate that the recipient has retrieved the medication package 18. In some embodiments, the UAV 10 may capture image data, using the image-capturing device 26, of the recipient retrieving the medication package 18 from the deposition location. The UAV 10 may communicate the image data via the wireless mesh network, as described.

If the computing device 100 determines that the medication package 18 has been retrieved, the computing device 100 discontinues monitoring the medication package 18. Conversely, if the computing device 100 determines, within the threshold amount time before the thermal control period expires, that the recipient has not retrieved the medication package 18 from the deposit location, the computing device 100 may instruct the UAV 10 or one of the other UAVs 10' to retrieve the medication package 18 and to return the medication package 18 to the hub station 210 for later delivery.

It should be understood that the computing device 100 may receive, monitor, or analyze any suitable data instead of or in addition to the data or measurements described herein and may determine whether to deliver the medication package 18 and/or to retrieve the medication package 18 using any suitable data instead of or in addition to the data or measurements described herein. Additionally, or alternatively, the computing device 100 may determine whether to deliver the medication package 18 and/or to retrieve the medication package 18 using any suitable technique in addition to or other than those described herein.

In some embodiments, the computing device 100 and/or the system 200 may perform the methods described herein. However, the methods described herein as performed by the computing device 100 and/or the system 200 are not meant to be limiting, and any type of software executed on a computing device or a combination of various computing devices may perform the methods described herein without departing from the scope of this disclosure.

The UAV 10 delivers medications, e.g., prescribed medications, from a fulfillment center, e.g., a pharmacy, to a delivery location, e.g., a patient home, a healthcare facility, a workplace and the like. Many patients receive a recurring medication, e.g., a maintenance medication, e.g., blood pressure medication, steroids, insulin and the like. These medications can be repeatedly delivered to the same delivery location. Each time a UAV 10 arrives at the delivery location it can use its imager and sensors to take reading at the actual delivery location. This data would be the most accurate for the environmental conditions for that delivery location. The data from the sensors and imager can be used to develop an accurate model of the environment of the delivery. For example, while the delivery location is generally in a southern climate, e.g., with many days of direct sunlight and warm temperatures, e.g., over 320 days are sunny and temperatures in the summer are typically greater than 90 degrees F., the actual delivery location on a rear porch of a home is shaded in the morning or afternoon, then the actual data about the delivery location, which can be stored in a database, can be accessed and used to calculate delivery times and the time a package containing a medication can remain at the delivery location. Continuing this example, a delivery location a short distance away and possibly around the corner would be in direct sunlight and have use its thermal budget faster as the delivery location is in direct sunlight all day. Only the UAVs being at the delivery locations can determine this level of granularity of environmental conditions for the multitude of delivery locations.

Figure 4:
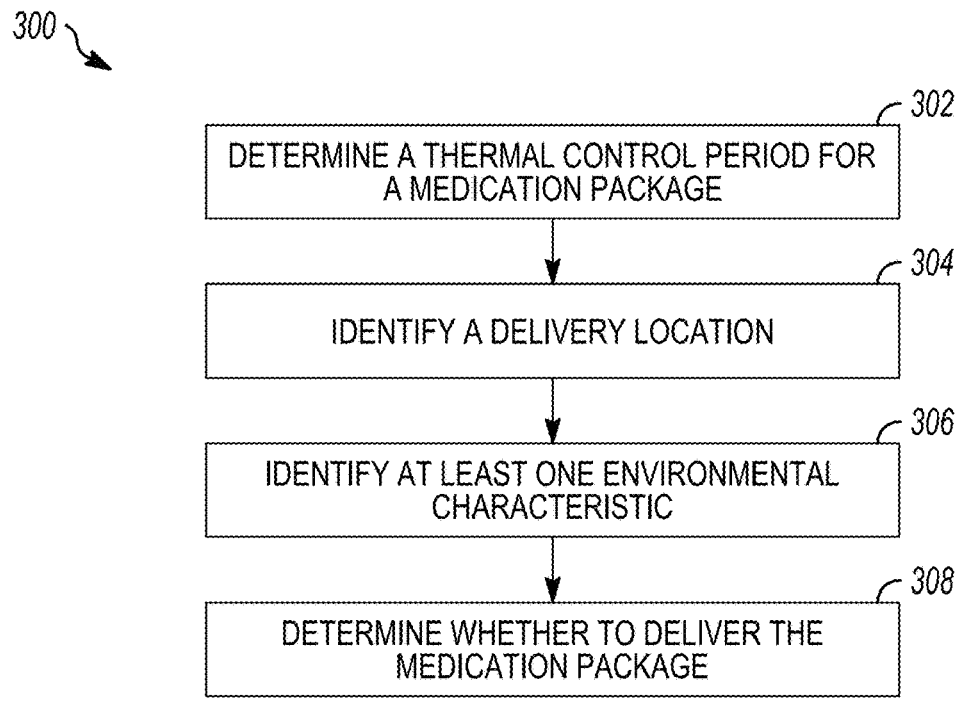
FIG. 4 is a flow diagram generally illustrating a medication package delivery method according to the principles of the present disclosure.

FIG. 4 is a flow diagram generally illustrating a medication package delivery method 300 according to the principles of the present disclosure. At 302, the method 300 determines a thermal control period for a medication package. For example, the computing device 100 determines the thermal control period for the medication package 18.

At 304, the method 300 identifies a delivery location. For example, the computing device 100 determines, using the received instructions to deliver the medication package 18, the delivery destination for the medication package 18.

At 306, the method 300 identifies at least one environmental characteristic. For example, the computing device 100 identifies at least one of the environmental characteristics of the delivery route, the delivery destination, and/or the deposit location for the medication package 18.

At 308, the method 300 determines whether to deliver the medication package. For example, the computing device 100 determines whether to deliver the medication package 18 during the estimated delivery period based on the at least one environmental characteristic of the delivery route, the delivery destination, and/or the deposit location for the medication package 18.

Figure 5:
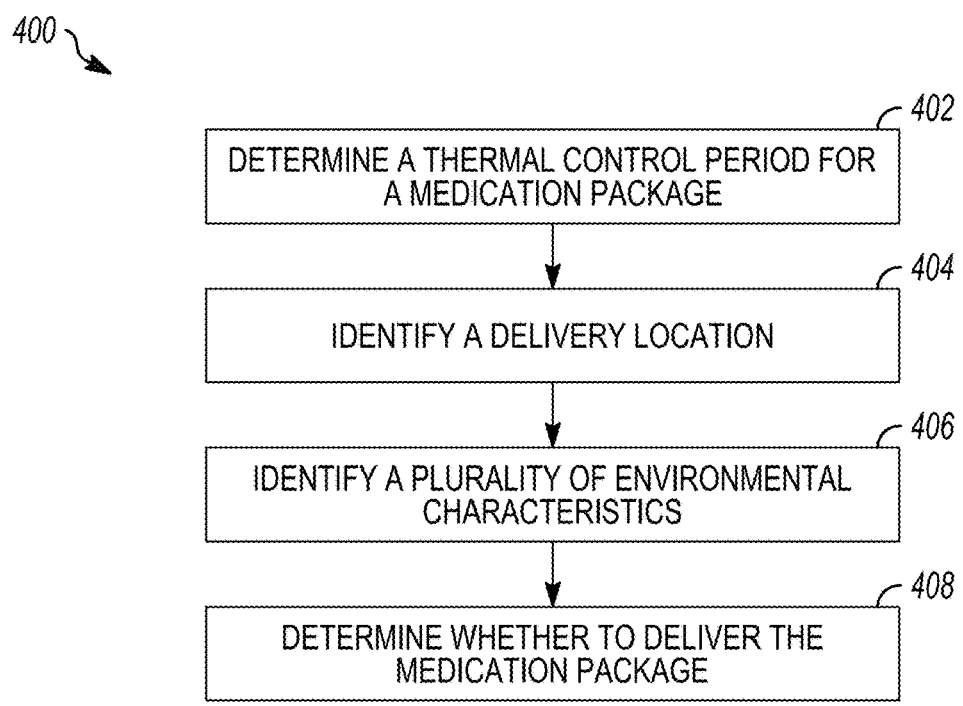
FIG. 5 is a flow diagram generally illustrating an alternative medication package delivery method according to the principles of the present disclosure.

FIG. 5 is a flow diagram generally illustrating an alternative medication package delivery method 400 according to the principles of the present disclosure. At 402, the method 400 determines a thermal control period for a medication package. For example, the computing device 100 determines the thermal control period for the medication package 18.

At 404, the method 400 identifies a delivery location. For example, the computing device 100 determines, using the received instructions to deliver the medication package 18, the delivery destination for the medication package 18.

At 406, the method 400 identifies a plurality of environmental characteristics. For example, the computing device 100 identifies a plurality of the environmental characteristics of the delivery route, the delivery destination, and/or the deposit location for the medication package 18.

At 408, the method 400 determines whether to deliver the medication package. For example, the computing device 100 determines whether to deliver the medication package 18 during the estimated delivery period based on the plurality of the environmental characteristics of the delivery route, the delivery destination, and/or the deposit location for the medication package 18.

Figure 6:
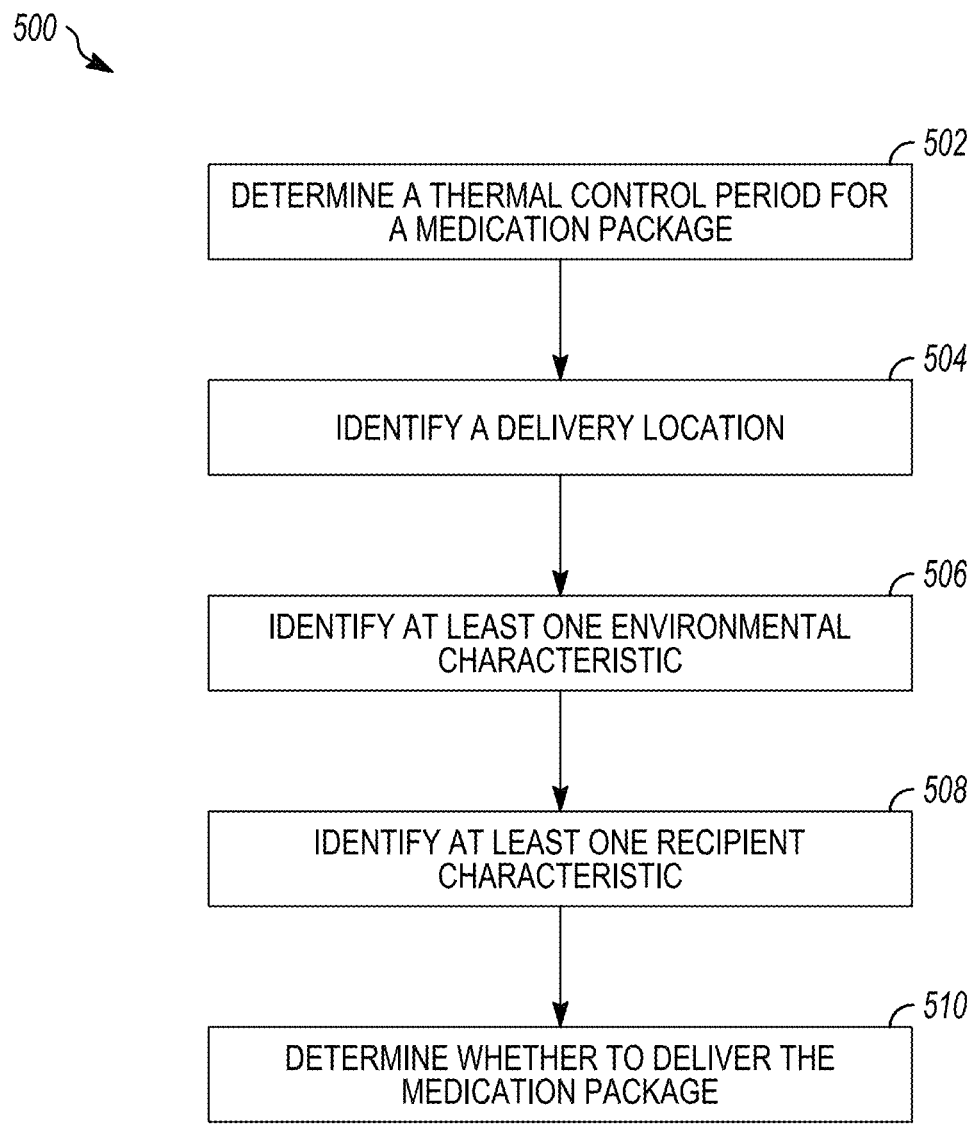
FIG. 6 is a flow diagram generally illustrating an alternative medication package delivery method according to the principles of the present disclosure.

FIG. 6 is a flow diagram generally illustrating an alternative medication package delivery method 500 according to the principles of the present disclosure. At 502, the method 500 determines a thermal control period for a medication package. For example, the computing device 100 determines the thermal control period for the medication package 18.

At 504, the method 500 identifies a delivery location. For example, the computing device 100 determines, using the received instructions to deliver the medication package 18, the delivery destination for the medication package 18.

At 506, the method 500 identifies at least one environmental characteristic. For example, the computing device 100 identifies at least one of the environmental characteristics of the delivery route, the delivery destination, and/or the deposit location for the medication package 18.

At 508, the method 500 identifies at least one recipient characteristic. For example, the computing device 100 identifies at least one of the recipient characteristics, as described.

At 510, the method 500 determines whether to deliver the medication package. For example, the computing device 100 determines whether to deliver the medication package 18 during the estimated delivery period based on the at least one environmental characteristic (e.g., of the delivery route, the delivery destination, and/or the deposit location for the medication package 18) and the at least one recipient characteristic.

Figure 7:
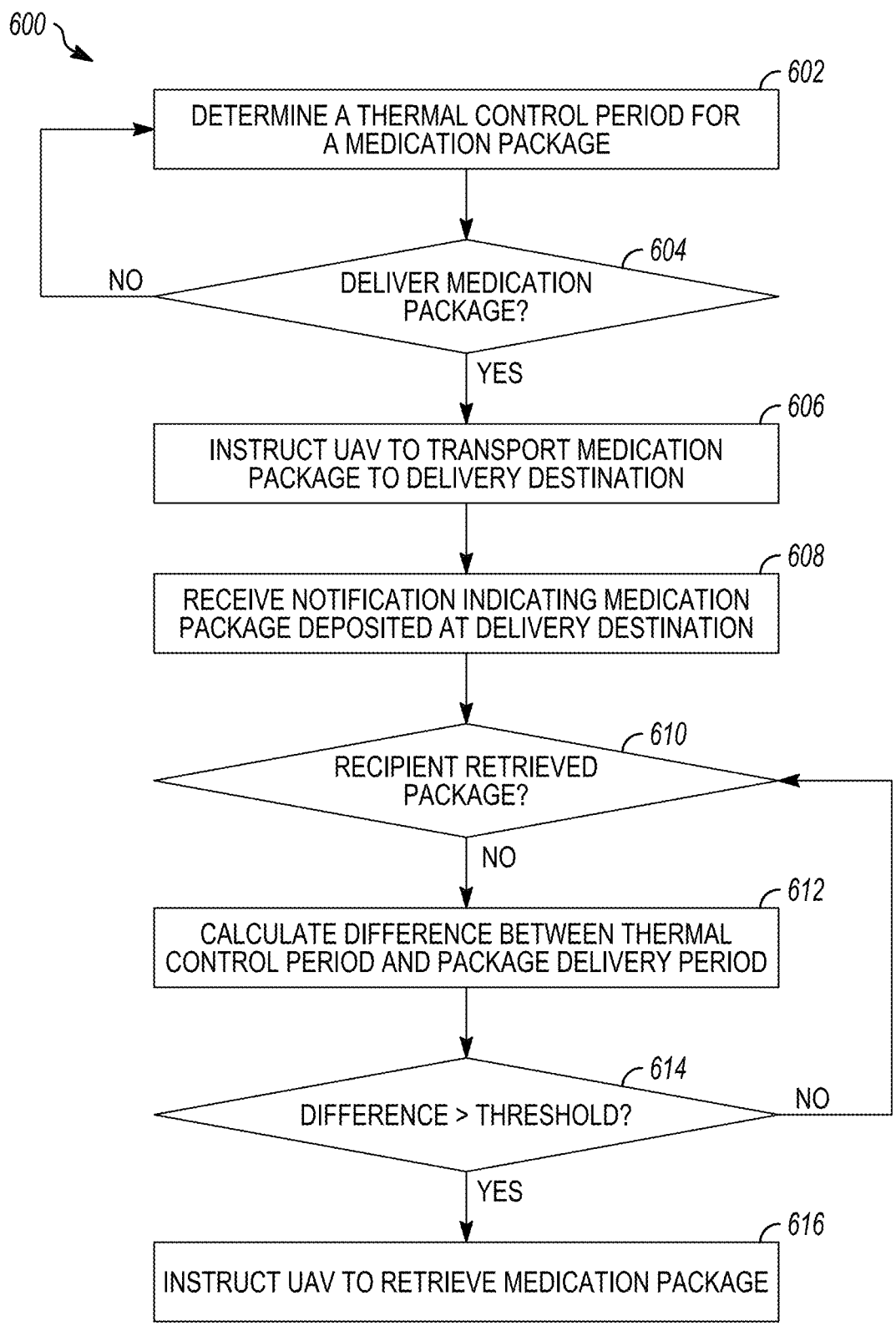
FIG. 7 is a flow diagram generally illustrating an alternative medication package delivery method according to the principles of the present disclosure.

FIG. 7 is a flow diagram generally illustrating an alternative medication package delivery method 600 according to the principles of the present disclosure. At 602, the method 600 determines a thermal control period for a medication package. For example, the computing device 100 determines the thermal control period for the medication package 18.

At 604, the method 600 determines whether to deliver the medication package. For example, the computing device 100 determines whether to deliver the medication package 18 based on the thermal control period, the environmental characteristic, the location specific characteristics, the recipient characteristics, the probabilities that the recipient will retrieve the medication package 18 during a corresponding period, any other suitable information, or a combination thereof. If the computing device 100 determines to deliver the medication package 18, the method 600 continues at 606. If the computing device 100 determines not to deliver the medication package 18, the method 600 continues at 602.

At 606, the method 600 instructs a UAV to transport the medication package to a delivery destination. For example, the computing device 100 instructs the UAV 10 to transport the medication package 18 to the delivery destination.

At 608, the method 600 receives a notification indicating that the medication package was deposited at the delivery destination. For example, the UAV 10 may communicate a notification to the computing device 100 indicating that the UAV 10 deposited the medication package 18 at the deposit location. The UAV 10 may communicate with one or more of the UAVs 10', which then may communicate the notification to the computing device 100 or the UAV 10 may communicate directly with the computing device 100. In some embodiments, the computing device 100 may receive sensor information from the one or more sensors of the medication package 18 indicating that the medication package 18 has been deposited at the delivery destination or at the deposit location.

At 610, the method 600 determines whether a recipient has retrieved the medication package. For example, the computing device 100 determines whether the recipient has retrieved the medication package 18. If the computing device 100 determines that the recipient has retrieved the medication package 18, the method 600 ends. If the computing device 100 determines that the recipient has not retrieved the medication package 18, the method 600 continues at 612.

At 612, the method 600 calculates a difference between the thermal control period and a package delivery period. For example, the computing device 100 may determine the difference between the thermal control period and the delivery period. The difference may indicate an amount of time remaining before the thermal control period expires.

At 614, the method 600 determines whether the difference is greater than a threshold. For example, the computing device 100 determines whether the difference is greater than the threshold. If the computing device 100 determines that the difference is less than the threshold, the method 600 continues at 610. If the computing device 100 determines that the difference is greater than the threshold, the method 600 continues at 616.

At 616, the method 600 instructs a UAV to retrieve the medication package. For example, the computing device 100 instructs the UAV 10 or one of the UAVs 10' to retrieve the medication package 18 from the deposit location and to return the medication package 18 to the hub station 210 for later delivery. The UAV 10 or the one of the UAVs 10' may retrieve the medication package 18 from the deposit location. The UAV 10 or the one of the UAVs 10' may return the medication package 18 to the hub station 210.

Figure 8:
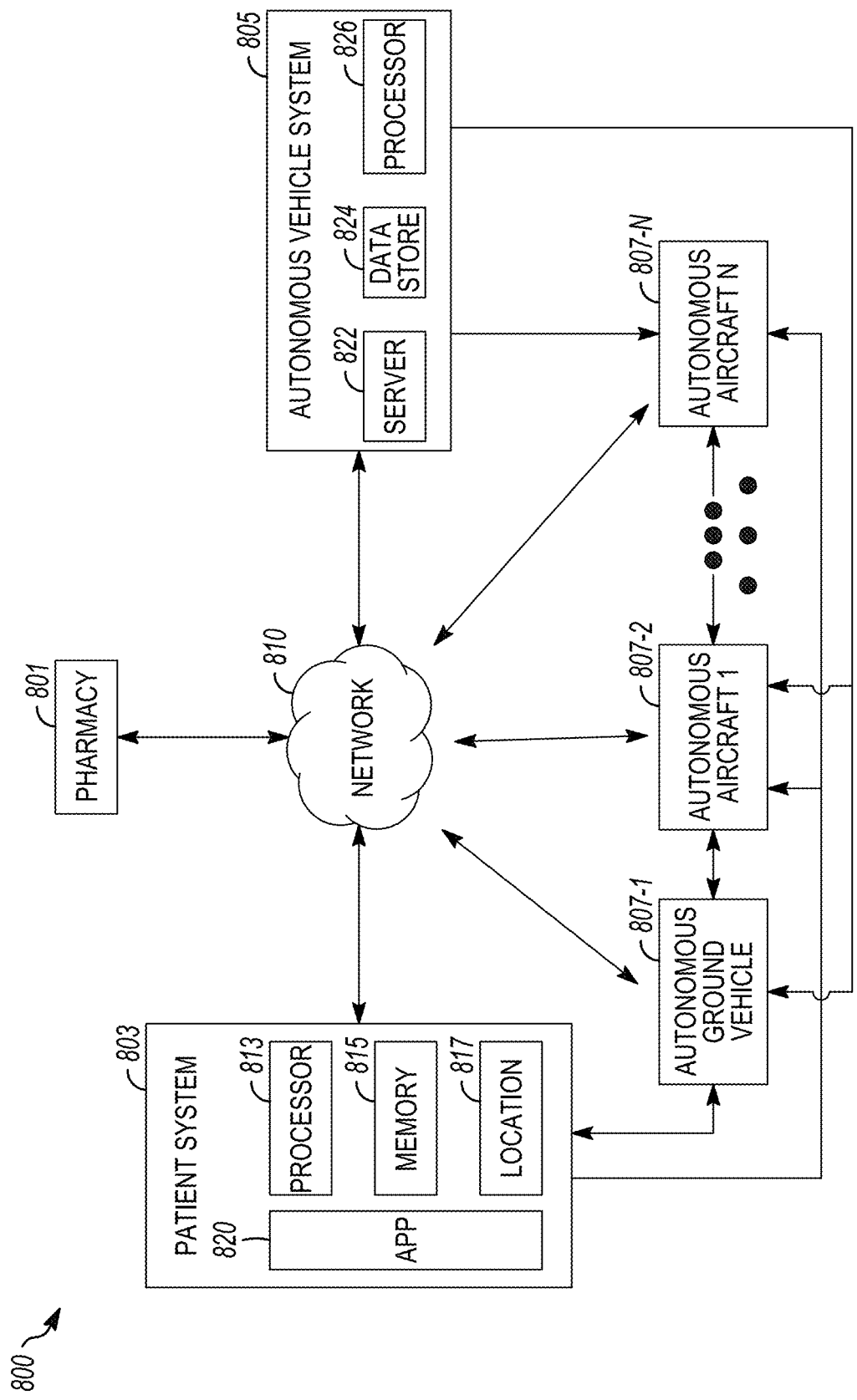
FIG. 8 generally illustrates a schematic view of system according to the principles of the present disclosure.

FIG. 8 generally illustrates a schematic view of a system 800 according to the principles of the present disclosure. The system 800 includes a pharmacy 801, a patient system 803, an autonomous vehicle system 805, and a plurality of autonomous vehicles 807-1, 807-2 . . . 807-N, which may be connected over a communication network 810, e.g., a global computer system such as the Internet, or a mobile communication system.

The pharmacy 801 may include a plurality of systems to receive, adjudicate, approve, schedule, and fill a prescription order. The pharmacy 801 may include a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use a device to submit the claim to a pharmacy benefits management system for adjudication. For example, this may allow the sharing of member information such as drug history that may allow the pharmacy to better service a member (for example, by providing more informed therapy consultation and drug interaction information).

In some embodiments, a benefit manager device may track prescription drug fulfillment and/or other information for users that are not members, or have not identified themselves as members, at the time (or in conjunction with the time) in which they seek to have a prescription filled at a pharmacy. The pharmacy 801 may include a pharmacy fulfillment device, an order processing device, and a pharmacy management device in communication with each other directly and/or over a network. The order processing device may receive information regarding filling prescriptions and may direct an order component to one or more devices of the pharmacy fulfillment device at a pharmacy. The pharmacy fulfillment device may fulfill, dispense, aggregate, and/or pack the order components of the prescription drugs in accordance with one or more prescription orders directed by the order processing device. The pharmacy fulfillment device may include automated systems to fill a prescription or fill environmentally controlled drugs as part of a medicine order.

The medicine order may include a temperature controlled drug as described herein. The pharmacy 801 may set the thermal parameters that must be adhered to during delivery. Accordingly, the pharmacy 801 may include one or more physical computers and data storage. The data store may store related to each individual drug that requires temperature control. An example of such a system is described in U.S. Pat. No. 8,600,903 issued to Charles Eller, filed Jun. 14, 2007, and U.S. patent application Ser. No. 14/630,373, filed Feb. 24, 2015, which are both hereby incorporated by reference for any purpose. In an example embodiment, a method for determining the thermal budget for a package containing a medication is performed using the environmental data from the UAVs. An acceptable temperature range of a temperature sensitive health care product is identified. The acceptable temperature range can be based on a temperature range at which the temperature sensitive product maintains freshness and efficacy. A forecasted temperature associated with a product origin location of the temperature sensitive health care product is identified. A forecasted temperature associated with a product delivery location of the temperature sensitive health care product is identified and can be at least partially based on past environmental data measured at the delivery location, currently measured environmental data at the delivery location, or combinations thereof. An anticipated transit duration of the temperature sensitive health care product is identified. A quantity of temperature control elements having a starting temperature to include in a shipping container to maintain the acceptable temperature range of the temperature sensitive health care product within the shipping container based on the forecasted temperature associated with the product origin location, the forecasted temperature associated with the product destination location, the anticipated transit duration is determined. A barrier element is positioned within the shipping container. The barrier element separately maintains the quantity of temperature control elements and the temperature sensitive health care product in the shipping container. The identification steps can be performed by a data processor, which can be part of the computing device 100, pharmacy 801, the unit of use packing device 930 or similar computing devices.

The pharmacy 801 packages medicine orders for delivery by one or more of the autonomous vehicles 807-1, 807-2 . . . 807-N. The pharmacy 801 may include shipping stations whereat one or more of the autonomous vehicles 807-1, 807-2 . . . 807-N, or ground shippers may pick up a packaged medical order for delivery to a patient delivery location. The pharmacy may communicate with the patient system 803, which may be an app on a computing device registered to the patient, the autonomous vehicle system 805 and each of the autonomous delivery vehicles 807-1, 807-2 . . . 807-N. The information from the pharmacy 801 about an individual package may determine if the package is delivered by the ground vehicle 807-1 or flown using an autonomous aircraft 807-2 . . . 807-N. The aircraft 807-2 . . . 807-N may include any of the components and perform the methods described herein. The aircraft may communicate with each other as a mesh network while in flight to share sensed data, e.g., environmental characteristics at the location of the aircraft.

The patient system 803 may be used to place an order for a drug package, e.g., for delivery by one or more of the autonomous vehicles 807-1, 807-2 . . . 807-N. The patient system 803 may utilize one or more computing devices 842 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 820, such as a web browser or a dedicated application, and may be connected to or otherwise communicate with the pharmacy 801 or the autonomous vehicles 807-1, 807-2 . . . 807-N through the communication network 810 using the transmission and the receipt of digital data. The patient system 803 includes a processor 813 to execute dedicated instructions that are stored in a memory 815.

The patient system 803 may include a location sensor, e.g., satellite navigation, to track the location of the patient relative to the delivery location that the vehicle 807-1, 807-2 . . . or 807-N will drop off the package. The patient system 803 may also provide local weather data, e.g., temperature and sunlight to the present system to be used in the calculation of the thermal budget of a package being carried by the vehicle 807-1, 807-2 . . . 807-N or waiting at the delivery location. The vehicles 807-1, 807-2 . . . 807-N may also communicate their location to the patient system 803 to alert the patient when the package will arrive, when the package is dropped off and the estimate of time that the present system will leave the package at the delivery location. The patient system 803, e.g., through the software application 820 and network, that the package has been picked up to the vehicles 807-1, 807-2 . . . 807-N, the vehicle system 805 and/or to the pharmacy 801.

The autonomous vehicles 807-1, 807-2 . . . 807-N may be any type or form of self-powered vehicle capable of being programmed or otherwise configured for autonomous travel to deliver packages, e.g., medical packages with medicines in need of controlled environments as described herein. Each of the autonomous vehicles may include one or more electrical components described herein, e.g., at least one processor, a memory, sensors, and a communication devices to communicate with each other and through the network 810. For example, the autonomous aircraft may receive instructions or other information or data via the communication device for its flight path, delivery location, and sensing of the environment over the path over the network. In an example, the network 810 and vehicles communicate wirelessly, e.g., over mobile protocols or standard wireless protocols such as Bluetooth® or any Wireless Fidelity (or "Wi-Fi"). The aircraft and ground vehicle may also communicate through one or more wired communication connections, e.g., Universal Serial Bus (or "USB") or fiber optic cable.

The autonomous vehicle system 805 may include a server to provide delivery paths and locations to the vehicles for delivery of packages. The autonomous vehicle system 805 may include a memory to store the maps, weather, at least one environment characteristic, vehicle data (e.g., distance capability, battery charge, payload capacity, computed thermal budget for each package and the like) to be used by the server 822 or a processor 826. The server 822 may also receive updated data from the patient system 803 or the vehicles 807-1, 807-2 . . . 807-N. This data may be used to calculate updated instructions for the vehicles or to trigger the instructions described herein.

Figure 9:
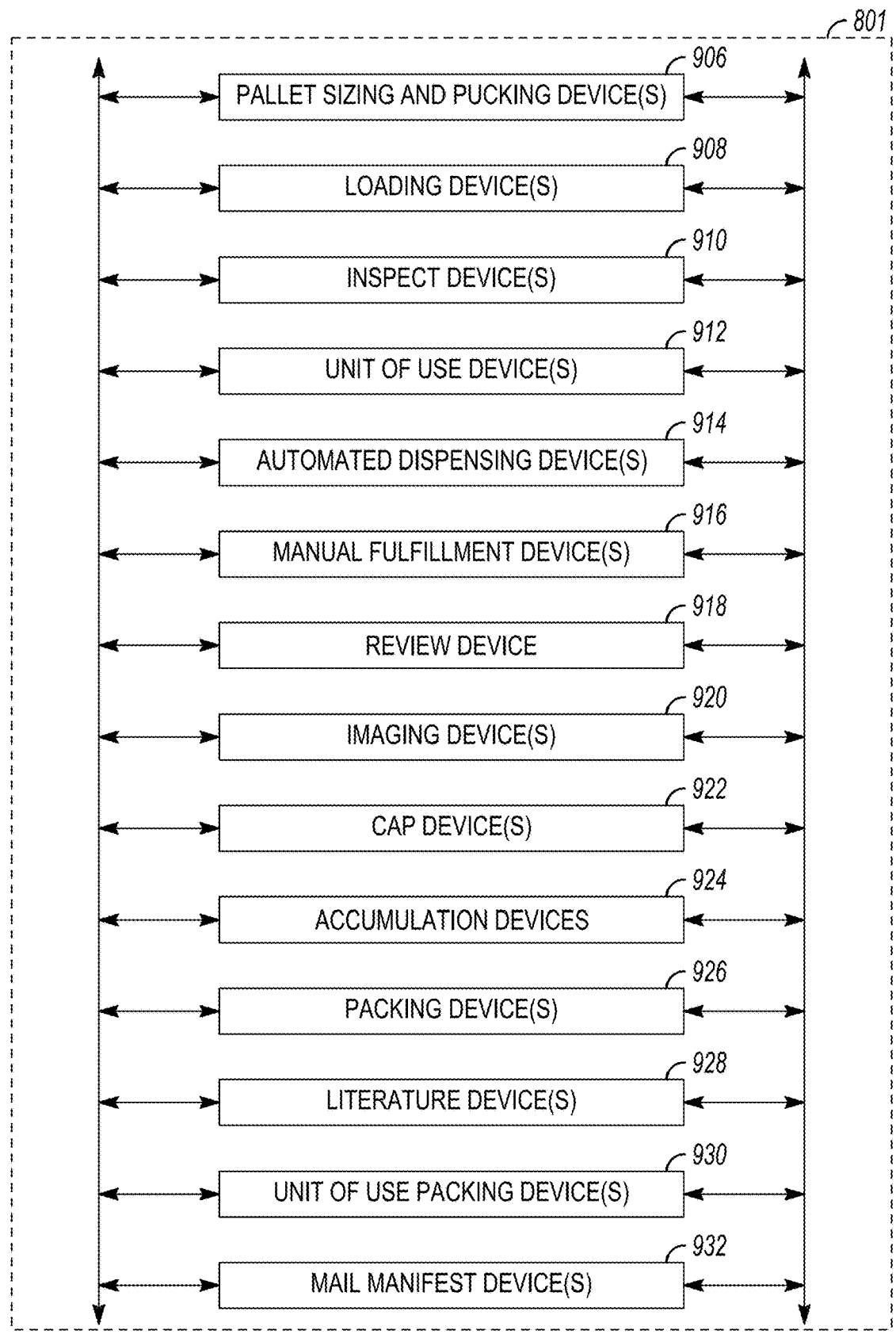
FIG. 9 generally illustrates a pharmacy according to the principles of the present disclosure.

FIG. 9 generally illustrates the pharmacy 801 according to the principles of the present disclosure. The pharmacy 801 may be used to process and fulfill prescriptions and prescription orders. After fulfillment, the fulfilled prescriptions are packed for shipping.

The pharmacy 801 may include devices in communication with a benefit manager device, an order processing device, and/or the storage device, directly or over the network. Specifically, the pharmacy 801 may include pallet sizing and pucking device(s) 906, loading device(s) 908, inspect device(s) 910, unit of use device(s) 912, automated dispensing device(s) 914, manual fulfillment device(s) 916 (which may be fulfill environmentally controlled drugs), review devices 918, imaging device(s) 920, cap device(s) 922, accumulation devices 924, packing device(s) 926, literature device(s) 928, unit of use packing device(s) 930 (which may be pack environmentally controlled drugs), and mail manifest device(s) 232. Further, the pharmacy 801 may include additional devices, which may communicate with each other directly or over the network.

In some embodiments, operations performed by one of these devices 906-932 may be performed sequentially, or in parallel with the operations of another device as may be coordinated by the order processing device, which may include a dedicated processor in operable communication with a memory. In some embodiments, the order-processing device tracks a prescription with the pharmacy based on operations performed by one or more of the devices 906-932.

In some embodiments, the pharmacy may transport prescription drug containers, for example, among the devices 906-932 in the high-volume fulfillment center, by use of pallets. The pallet sizing and pucking device 906 may configure pucks in a pallet. A pallet may be a transport structure for a number of prescription containers, and may include a number of cavities. A puck may be placed in one or more than one of the cavities in a pallet by the pallet sizing and pucking device 906. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device based on prescriptions that the order processing device decides to launch. The arrangement logic may be implemented directly in the pallet sizing and pucking device 906. Once a prescription is set to be launched, a puck suitable for the appropriate size of container for that prescription may be positioned in a pallet by a robotic arm or pickers. The pallet sizing and pucking device 906 may launch a pallet once pucks have been configured in the pallet.

The loading device 908 may load prescription containers into the pucks on a pallet by a robotic arm, a pick and place mechanism (also referred to as pickers), etc. In various embodiments, the loading device 908 has robotic arms or pickers to grasp a prescription container and move it to and from a pallet or a puck. The loading device 908 may also print a label that is appropriate for a container that is to be loaded onto the pallet, and apply the label to the container. The pallet may be located on a conveyor assembly during these operations (e.g., at the high-volume fulfillment center, etc.).

The inspect device 910 may verify that containers in a pallet are correctly labeled and in the correct spot on the pallet. The inspect device 910 may scan the label on one or more containers on the pallet. Labels of containers may be scanned or imaged in full or in part by the inspect device 910. Such imaging may occur after the container has been lifted out of corresponding puck by a robotic arm, picker, etc., or may be otherwise scanned or imaged while retained in the puck. In some embodiments, images and/or video captured by the inspect device 910 may be stored in the storage device as order data.

The unit of use device 912 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, temperature controlled drugs, etc. Prescription drug products dispensed by the unit of use device 912 may be packaged individually or collectively for shipping, or may be shipped in combination with other prescription drugs dispensed by other devices in the high-volume fulfillment center. The unit of use device 912, in the case of thermally controlled medications, may compute the packaging and coolant devices to be used in the medication package using actual delivery location environmental characteristics and data relating to the delivery location.

At least some of the operations of the devices 906-932 may be directed by the order processing device. For example, the manual fulfillment device 916, the review device 918, the automated dispensing device 914, and/or the packing device 926, etc. may receive instructions provided by the order processing device.

The automated dispensing device 914 may include one or more devices that dispense prescription drugs or pharmaceuticals into prescription containers in accordance with one or multiple prescription orders. In general, the automated dispensing device 914 may include mechanical and electronic components with, in some embodiments, software and/or logic to facilitate pharmaceutical dispensing that would otherwise be performed in a manual fashion by a pharmacist and/or pharmacist technician. For example, the automated dispensing device 914 may include high-volume fillers that fill a number of prescription drug types at a rapid rate and blister pack machines that dispense and pack drugs into a blister pack. Prescription drugs dispensed by the automated dispensing devices 914 may be packaged individually or collectively for shipping, or may be shipped in combination with other prescription drugs dispensed by other devices in the high-volume fulfillment center.

The manual fulfillment device 916 controls how prescriptions are manually fulfilled. For example, the manual fulfillment device 916 may receive or obtain a container and enable fulfillment of the container by a pharmacist or pharmacy technician. In some embodiments, the manual fulfillment device 916 provides the filled container to another device in the pharmacy fulfillment devices to be joined with other containers in a prescription order for a user or member. For example, non-environmentally controlled drugs and environmentally controlled drugs may be filled and joined together for packaging.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. or retrieve drugs from a cooler. Some portions of the manual fulfillment process may be automated by use of a machine. For example, counting of capsules, tablets, or pills may be at least partially automated (such as through use of a pill counter). Prescription drugs dispensed by the manual fulfillment device 916 may be packaged individually or collectively for shipping, or may be shipped in combination with other prescription drugs dispensed by other devices in the high-volume fulfillment center.

The review device 918 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 918 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review may be performed at a manual review station.

The imaging device 920 may image containers once they have been filled with pharmaceuticals. The imaging device 920 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. A temperature controlled package may be imaged to ensure the correct coolant is in the package. The images may be transmitted to the order processing device and/or stored in the storage device as part of the order data.

The cap device 922 may be used to cap or otherwise seal a prescription container. In some embodiments, the cap device 922 may secure a prescription container with a type of cap in accordance with a user preference (e.g., a preference regarding child resistance, etc.), a plan sponsor preference, a prescriber preference, etc. The cap device 922 may also etch a message into the cap, although this process may be performed by a subsequent device in the high-volume fulfillment center.

The accumulation device 924 accumulates various containers of prescription drugs in a prescription order. The accumulation device 924 may accumulate prescription containers from various devices or areas of the pharmacy. For example, the accumulation device 924 may accumulate prescription containers from the unit of use device 912, the automated dispensing device 914, the manual fulfillment device 916, and the review device 918. The accumulation device 924 may be used to group the prescription containers prior to shipment to the member.

The literature device 928 prints, or otherwise generates, literature to include with each prescription drug order. The literature may be printed on multiple sheets of substrates, such as paper, coated paper, printable polymers, or combinations of the above substrates. The literature printed by the literature device 928 may include information required to accompany the prescription drugs included in a prescription order, other information related to prescription drugs in the order, financial information associated with the order (for example, an invoice or an account statement), etc.

In some embodiments, the literature device 928 folds or otherwise prepares the literature for inclusion with a prescription drug order (e.g., in a shipping container). In other embodiments, the literature device 928 prints the literature and is separate from another device that prepares the printed literature for inclusion with a prescription order.

The packing device 926 packages the prescription order in preparation for shipping the order. The packing device 926 may box, bag, or otherwise package the fulfilled prescription order for delivery. The packing device 926 may further place inserts (e.g., literature or other papers, etc.) into the packaging received from the literature device 928. For example, bulk prescription orders may be shipped in a box, while other prescription orders may be shipped in a bag, which may be a wrap seal bag.

The packing device 926 may label the box or bag with an address and a recipient's name. The label may be printed and affixed to the bag or box, be printed directly onto the bag or box, or otherwise associated with the bag or box. The packing device 926 may sort the box or bag for mailing in an efficient manner (e.g., sort by delivery address, etc.). The packing device 926 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise to a delivery location. Some packages will be delivered using autonomous delivery vehicles, e.g., ground vehicles or aircraft, to the delivery location.

The unit of use packing device 930 packages a unit of use prescription order in preparation for shipping the order. The unit of use packing device 930 may include manual scanning of containers to be bagged for shipping to verify each container in the order. In an example implementation, the manual scanning may be performed at a manual scanning station. A mail manifest device 232 may print mailing labels used by the packing device 926 and may print shipping manifests and packing lists.

Multiple devices may share processing and/or memory resources. The devices 906-932 may be located in the same area or in different locations. For example, the devices 906-932 may be located in a building or set of adjoining buildings. The devices 906-932 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

In some embodiments, a method for controlling an autonomous unmanned aerial vehicle for delivery of a medication package includes determining a thermal control period for the medication package. The method also includes identifying a delivery location corresponding to the medication package. The method also includes identifying at least one environmental characteristic of an environment that includes a delivery three-dimensional flight path between a starting location and the delivery location, wherein the at least one environmental characteristic indicates an actual weather value at the delivery location. The method also includes determining whether to deliver the medication package based on the thermal control period and the at least one environmental characteristic, using the unmanned aerial vehicle.

In some embodiments, the thermal control period corresponds to a period that a medication of the medication package may safely remain in the medication package. In some embodiments, the at least one environmental characteristic includes a thermal profile of the delivery location. In some embodiments, the at least one environmental characteristic includes a maximum predicted wind velocity along the delivery flight path. In some embodiments, the at least one environmental characteristic includes an average predicted wind velocity along the delivery flight path. In some embodiments, the at least one environmental characteristic includes an average predicted thermal exposure of the medication package along the delivery flight path. In some embodiments, the at least one environmental characteristic includes an average predicted thermal exposure of the medication package during a period the medication package is estimated to be at the delivery location. In some embodiments, the method also includes identifying at least one recipient characteristic corresponding to a recipient of the medication package, wherein determining whether to deliver the medication package is further based on the at least one recipient characteristic. In some embodiments, the unmanned aerial vehicle communicates with at least other unmanned aerial vehicles using a mesh network.

In some embodiments, an apparatus for controlling unmanned flight delivery of a medication package includes a processor and a memory. The memory includes instructions that, when executed by the processor, cause the processor to: determine a thermal control period for the medication package; identify a delivery location corresponding to the medication package; identify at least one environmental characteristic of an environment that includes a delivery three-dimensional flight path between a starting location and the delivery location, wherein the at least one environmental characteristic includes, at least, an actual weather condition at the delivery location; and determine whether to deliver the medication package based on the thermal control period and the at least one environmental characteristic, using an unmanned aerial vehicle.

In some embodiments, the thermal control period corresponds to a period that a medication of the medication package may safely remain in the medication package. In some embodiments, the at least one environmental characteristic includes a thermal profile of the delivery location. In some embodiments, the at least one environmental characteristic includes a maximum predicted wind velocity along the delivery flight path. In some embodiments, the at least one environmental characteristic includes an average predicted wind velocity along the delivery flight path. In some embodiments, the at least one environmental characteristic includes an average predicted thermal exposure of the medication package along the delivery flight path. In some embodiments, at least one environmental characteristic includes an average predicted thermal exposure of the medication package during a period the medication package is estimated to be at the delivery location. In some embodiments, the instructions further cause the processor to identify at least one recipient characteristic corresponding to a recipient of the medication package; and determine whether to deliver the medication package based on the thermal control period; the at least one environmental characteristic; and the at least one recipient characteristic. In some embodiments, the unmanned aerial vehicle communicates with at least other unmanned aerial vehicles using a mesh network.

In some embodiments, a computing device for controlling delivery of a medication package includes at least one processor and at least one memory. The at least one memory includes instructions that, when executed by the at least one processor, cause the at least one processor to: determine a thermal control period for the medication package; determine whether to deliver the medication package based on the thermal control period and at least one environmental characteristic corresponding to a delivery path between a delivery hub and a delivery destination; in response to a determination to deliver the medication package, selectively instruct an unmanned aerial vehicle to transport the medication package from the delivery hub to the delivery destination; receive a notification from the unmanned aerial vehicle indicating that the unmanned aerial vehicle deposited the medication package at the delivery destination; determine, in response to receiving the notification, whether a recipient of the medication package has retrieved the medication package; in response to a determination that the recipient of the medication package has not retrieved the medication package, calculate a difference between the thermal control period and a package delivery period, the package delivery period corresponding to a period between the unmanned aerial vehicle leaving the delivery hub with the medication package and a current time; and in response to a determination that the difference between the thermal control period and the package delivery period is less than a threshold, selectively instruct one of the unmanned aerial vehicle or one of a plurality of other unmanned aerial vehicles to retrieve the medication package from the delivery destination.

In some embodiments, the unmanned aerial vehicle and the plurality of other unmanned aerial vehicles include autonomous unmanned aerial vehicles.

In some embodiments, the package being delivered to the destination location has a thermal budget. The thermal budget can be defined as the thermal energy as a function of temperature and time experienced by the package contents, e.g., the medicine, drug, or the like. The thermal budget can be visualized the area under a time-temperature curve characterizing the storage and delivery process. Embodiments of the present disclosure attempt to minimize the impact on the thermal budget by reducing the travel time using UAVs to travel in a more straight line route to the delivery location, not be stored in a delivery van for hours, and use actual environmental characteristics at the delivery location. The delivery UAV or other UAVs can detect the environmental characteristics at the delivery location at the time of delivery, before delivery (e.g., by other UAVs), and after delivery by other UAVs. In some cases, UAV not delivering a package can be routed to the delivery location for a package delivered by another UAV to determine the actual environmental characteristics at the delivery location, e.g., temperature, wind, shade, direct sunlight, etc. The subsequent UAV can also confirm that the package has been removed from the delivery location by the recipient.

In computing the thermal budget, the present system can use the characteristics of the package itself to determine how the environment characteristics affect the thermal budget of the package contents. The package has certain thermal conductivity that may use the thermal budget of the package contents at different rates based on the environmental characteristic. Certain packages may reflect more sunlight than a different package, this will extend the time a package may be positioned at a delivery location in direct sunlight than the different package. Some packages may include greater insulation than a different package, which may extend the time this type of package may be positioned at a delivery location than the different package. All of characteristics of the package, the contents, the historical environmental characteristics, and the actual environmental characteristics can be used to determine when the delivery by UAV is made, the route of the UAV, and how long a package can remain at a delivery location can be used to calculate the delivery of the package contents.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a special purpose computer/processor may be utilized which may contain hardware for carrying out any of the methods, algorithms, or instructions described herein. The hardware may become a special purpose device when storing instructions, loading instructions, or executing instructions for the methods and/or algorithms described herein.

Further, all or a portion of implementations of the present disclosure may take the form of a computer program product accessible from, for example, a computer-usable or computer-readable medium. The program includes steps to perform, at least, portions of the methods described herein. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. An autonomous unmanned aerial vehicle for delivery of a package, comprising:
   a body;
   at least one rotor to provide flight travel connected to the body;
   a carrier connected to the body for releasably carrying a perishable-containing package with a perishable product;
   a solar sensor supported by the body;
   a controller in electrical communication with the at least one rotor, the controller being configured to:
   receive an initial thermal control period for the perishable-containing package;
   identify a delivery location corresponding to the medication package;

instruct the rotors to the delivery location;
identify at least one environmental characteristic along a three-dimensional flight path between a starting location and the delivery location;
determine delivery of the perishable-containing package based on a measured amount of sun exposure associated with the delivery location by the solar sensor;
in response to an indication that the unmanned aerial vehicle delivered the perishable-containing package to the delivery location, generate a first adjusted thermal control period based on the initial thermal control period and the measured amount of sun exposure;
compare the first adjusted thermal control period to a threshold thermal exposure; and
if the first adjusted thermal control period meets or exceeds the threshold thermal exposure, selectively instructing the rotors to retrieve the perishable-containing package from the delivery location.

2. The autonomous unmanned aerial vehicle of claim 1, wherein the initial thermal control period corresponds to a period that a medication of the perishable-containing package may safely remain in the perishable-containing package in an external environment.

3. The autonomous unmanned aerial vehicle of claim 1, wherein the controller further determines delivery based on a thermal profile of the three dimensional flight path to the delivery location.

4. The autonomous unmanned aerial vehicle of claim 3, wherein the controller further determines delivery based on a maximum predicted wind velocity along the three-dimensional flight path.

5. The autonomous unmanned aerial vehicle of claim 3, wherein the controller further determines delivery based on an average predicted wind velocity along the delivery flight path.

6. The autonomous unmanned aerial vehicle of claim 3, wherein the controller further determines delivery based on an average predicted thermal exposure of the perishable-containing package along the delivery flight path.

7. The autonomous unmanned aerial vehicle of claim 3, wherein the controller further determines delivery based on: a maximum predicted wind velocity along the three-dimensional flight path; an average predicted wind velocity along the delivery flight path; an average predicted thermal exposure of the perishable-containing package along the delivery flight path; or a combination thereof.

8. The autonomous unmanned aerial vehicle of claim 1, wherein the solar sensor includes an imager to detect in one or more images captured at the delivery location.

9. The autonomous unmanned aerial vehicle of claim 1, further comprising identifying at least one recipient characteristic corresponding to a recipient of the perishable-containing package, wherein determining delivery of the medication package is further based on the at least one recipient characteristic.

10. The autonomous unmanned aerial vehicle of claim 1, wherein the unmanned aerial vehicle communicates with at least other unmanned aerial vehicles using a mesh network to provide thermal exposure data for the perishable-containing package.

11. The autonomous unmanned aerial vehicle of claim 1, wherein the solar sensor includes an imager to detect in one or more images captured at the delivery location; and wherein the controller is configured to identify at least one recipient characteristic corresponding to a recipient of the perishable-containing package based in part on said one or more images.

12. A method for controlling unmanned flight delivery of a package, the apparatus comprising:
a processor; and
a memory that includes instructions that, when executed by the processor, cause the processor to:
determine a flight path for unmanned flight delivery of a package containing a perishable based on at least one environmental characteristic of an environment along a three-dimensional delivery flight path between a starting location and a delivery location, wherein the at least one environmental characteristic indicates, at least, an actual weather condition associated with the delivery three-dimensional flight path and solar exposure at the delivery location;
determine whether to deliver the medication package based on an initial thermal control period and the at least one environmental characteristic, using an unmanned aerial vehicle;
sensing solar exposure of the package at the delivery location;
adjusting thermal exposure of the package at the delivery location based on sensed solar exposure;
if the adjusted thermal exposure of the package at the delivery location exceeds the threshold thermal exposure, instruct the unmanned autonomous vehicle to return the package to climate controlled location.

13. The method of claim 12, wherein the adjusting the thermal exposure includes predicting a time to return the package to a climate controlled location such that the can return the package to the climate controlled location within a thermal limit of the perishable in the package.

14. The method of claim 12, wherein the processor operating to determine whether to deliver the package includes a maximum predicted wind velocity along the delivery flight path.

15. The method of claim 12, wherein the processor operating to determine whether to deliver the package includes an average predicted wind velocity along the delivery flight path.

16. The method of claim 12, wherein the processor operating to determine whether to deliver the package includes an average predicted thermal exposure of the package along the delivery flight path.

17. The method of claim 12, wherein the thermal exposure at the delivery location is associated with sun light exposure at the delivery location detected in one or more images captured by the unmanned aerial vehicle.

18. The method of claim 12, further comprising identifying at least one recipient characteristic corresponding to a recipient of the package and wherein delivery of the package is further based on the at least one recipient characteristic.

19. The method of claim 18, wherein the instructions further cause the processor to identify at least one recipient characteristic corresponding to a recipient of the package; and determine whether to deliver the package based on the thermal exposure; the at least one environmental characteristic; and the at least one recipient characteristic.

20. The method of claim 12, wherein the unmanned aerial vehicle communicates with at least other unmanned aerial vehicles using a mesh network to determine the at least one environmental characteristic along the delivery flight path.

* * * * *